US008419529B2

(12) United States Patent
Watanabe

(10) Patent No.: US 8,419,529 B2
(45) Date of Patent: Apr. 16, 2013

(54) TABLE GAME SYSTEM

(75) Inventor: Naoyuki Watanabe, Aichi (JP)

(73) Assignee: Kyoraku Industrial Co., Ltd., Aichi (JP)

( * ) Notice: Subject to any disclaimer, the term of this patent is extended or adjusted under 35 U.S.C. 154(b) by 0 days.

(21) Appl. No.: 13/153,306

(22) Filed: Jun. 3, 2011

(65) Prior Publication Data

US 2012/0276969 A1 Nov. 1, 2012

(30) Foreign Application Priority Data

Apr. 28, 2011 (JP) ................................ 2011-100450

(51) Int. Cl.
*G06F 19/00* (2006.01)

(52) U.S. Cl.
USPC .............................................. 463/25; 463/12

(58) Field of Classification Search .................... 463/12, 463/25
See application file for complete search history.

(56) References Cited

U.S. PATENT DOCUMENTS

| | | | | |
|---|---|---|---|---|
| 6,050,487 | A | 4/2000 | Bonifas et al. | 235/375 |
| 6,851,607 | B2 * | 2/2005 | Orus et al. | 235/380 |
| 6,852,031 | B1 * | 2/2005 | Rowe | 463/29 |
| 7,963,843 | B2 * | 6/2011 | Martin et al. | 463/25 |
| 8,210,920 | B2 * | 7/2012 | Chun | 463/12 |
| 2003/0073499 | A1 * | 4/2003 | Reece | 463/42 |
| 2006/0071429 | A1 | 4/2006 | Okujyo et al. | 273/292 |
| 2010/0197383 | A1 * | 8/2010 | Rader et al. | 463/25 |

FOREIGN PATENT DOCUMENTS

| | | |
|---|---|---|
| JP | HEI 9-293165 | 11/1997 |
| JP | HEI 10-500796 | 1/1998 |
| JP | 2005168664 | 6/2005 |

* cited by examiner

*Primary Examiner* — Dmitry Suhol
*Assistant Examiner* — Carl V Larsen
(74) *Attorney, Agent, or Firm* — Ladas & Parry LLP

(57) ABSTRACT

A table game system includes a dealer's game table for performing a table game. A dealer terminal can input game result information of the table game performed on the dealer's game table. A plurality of valuable information reading devices are provided at a position distant from the dealer's game table, and can read at least valuable information stored in a recording medium. A plurality of player terminals are provided to correspond to the valuable information reading devices, and can input betting information through reading the valuable information by the valuable information reading devices. A value adjustment device adjusts a value based on the valuable information. An administrative server is connected to each of the dealer terminal, the valuable information reading devices, the player terminals, and the value adjustment device via a communication line.

1 Claim, 18 Drawing Sheets

*FIG.17*

| No. | DATE AND TIME OF ISSUE | CARD ID | PLAYER TERMINAL ID | AMOUNT OF BET | PLACE OF BET | GAME RESULT | WIN/LOSE INFO. | DIVIDEND INFO. | MONEY INFO. |
|---|---|---|---|---|---|---|---|---|---|
| 1 | 2011.03.03 18:00 | ****01 | — | — | — | — | — | — | $10,000 |
| 2 | 2011.03.03 18:15 | ***758 | ****77 | $1,000 | — | — | — | — | $50,000 |
| 3 | 2011.03.03 18:20 | ***875 | ****33 | $10,000 | PLAYER | — | — | — | $120,000 |
| 4 | 2011.03.03 19:05 | ***213 | ****55 | — | — | — | — | — | $90,000 |
| 5 | 2011.03.03 19:07 | ***118 | ***927 | $10,000 | PLAYER | PLAYER | WIN | +$20,000 | $120,000 |
| .... | .... | | .... | .... | .... | .... | .... | .... | .... |

*FIG.18*

CARD ID「****01」

| HISTORY No. | DATE AND TIME | PLAYER TERMINAL ID | BET INFO. | | GAME RESULT | WIN/LOSE INFO. | MONEY INFO. | DIVIDEND INFO. |
|---|---|---|---|---|---|---|---|---|
| | | | AMOUNT OF BET | PLACE OF BET | | | | |
| 1 | 2011.03.03 18:15 | — | — | — | — | — | — | $10,000 |
| 2 | 2011.03.03 18:20 | ****01 | $100 | PLAYER | BANKER | LOSE | — | $9,900 |
| 3 | 2011.03.03 18:35 | ****08 | $1.000 | BANKER | BANKER | WIN | $1,950 | $11,850 |
| 4 | 2011.03.03 18:40 | ****09 | $1.000 | TIE | PLAYER | LOSE | — | $10,850 |
| .... | .... | .... | .... | .... | .... | .... | .... | .... |

TABLE GAME SYSTEM

CROSS-REFERENCE TO RELATED APPLICATIONS

This application claims priority of Japanese Patent Application No. 2011-100450 filed on Apr. 28, 2011, the disclosures of which is incorporated herein by reference.

BACKGROUND

1. Field of the Invention

The present invention generally relates to a table game system using game media such as cards and roulettes, and more particularly, to a table game system that can perform a table game by using a recording medium in which valuable information is stored.

2. Description of the Related Art

Generally, card games of playing cards (for example, baccarat game) and table games, such as a roulette game using a roulette, are widely known as casino games.

Recently, as for a system for supporting such table games, for example, a technique has been proposed that installs a plurality of terminals (hereinafter referred to as "the player terminals") used by game players at positions distant from a table (hereinafter referred to as "the dealer's game table") for a dealer to perform dealing, opening, and the like of cards, and delivers the images of the cards captured by a video camera to the player terminals (refer to Japanese Patent Application Laid-Open Publication No. 2005-168664). With such a table game system, it is possible for a large number of game players to participate in a game at the same time that is played on the dealer's game table.

Additionally, in the field of game device that allows playing of a game provided that money such as bills and coins are paid, the card system is widely used that allows playing of a game by using a recording card in which information regarding money (hereinafter referred to as "the money information") is stored in advance.

That is, when the card system as described in Japanese Patent Application Laid-Open Publication No. HEI10-500796 is applied to the table game system described in Japanese Patent Application Laid-Open Publication No. 2005-168664, it is not necessary for the game player to, for example, insert money into the player terminal or the like every time the game player places a bet, by inserting the recording card into a card reading device that is provided to correspond to the player terminal. Thus, it is possible to continuously and smoothly perform the table game within the money information stored in the recording card.

Further, generally, the money information stored in the recording card is adjusted to a prize, cash, or the like (hereinafter referred to as "the prize or the like", by inserting the recording card into a card adjustment device, and performing the adjustment based on the money information that is read by the card adjustment device (refer to Japanese Patent Application Laid-Open Publication No. HEI09-293165).

As described above, the card adjustment device described in Japanese Patent Application Laid-Open Publication No. HEI09-293165 is configured to perform adjustment based on the money information stored in the recording card. Hence, when it is impossible to read the money information by the card reading since the recording card is deformed, damaged or the like, the adjustment to the prize or the like cannot be performed. Accordingly, there is a problem in that the game player cannot enjoy the benefit obtained through the game.

SUMMARY

The present invention aims to solve the above-described problem, and an object thereof is to provide a table game system that can reliably obtain, at the time of adjustment of a recording medium such as a recording card, the money information to which the game result of a table game is reflected.

According to an aspect of the present invention there is provided a table game system including: a dealer's game table for performing a table game; a dealer terminal that can input game result information of the table game performed on the dealer's game table; a plurality of valuable information reading devices that are provided at a position distant from the dealer's game table, and can read at least valuable information stored in a recording medium; a plurality of player terminals that are provided to correspond to the valuable information reading devices, and can input betting information through reading the valuable information by the valuable information reading devices; a value adjustment device that adjusts a value based on the valuable information; and an administrative server that is connected to each of the dealer terminal, the valuable information reading devices, the player terminals, and the value adjustment device via a communication line, wherein one of the valuable information reading devices and the player terminals transmit, to the administrative server, at least player terminal identification information for identifying the player terminals, when the valuable information is read by the valuable information reading devices, the administrative server includes: a valuable information memory part that can store the valuable information stored in the recording medium in association with the player terminal identification information transmitted from one of the valuable information reading devices and the player terminals; a dividend information calculating part that calculates dividend information based on the game result information that is input from the dealer terminal and the betting information that is input from the player terminals; a valuable information updating part that can individually update the valuable information stored in the valuable information memory part in association with the player terminal identification information, based on the dividend information calculated by the dividend information calculating part; and an updated valuable information transmitting part that can transmit, to the value adjustment device, each set of updated valuable information that is stored in the valuable information memory part and is updated by the valuable information updating part, and the value adjustment device includes a player terminal identification information input part that can input the player terminal identification information, and obtains the updated valuable information from the updated valuable information transmitting part, when the player terminal identification information is input from the player terminal identification input part, the updated valuable information being stored in the valuable information memory part in association with the player terminal identification information.

Here, the "table game" recited in the present invention refers to a game played on a table, such as a card game using cards such as playing cards (for example, baccarat game), a roulette game in which a ball is thrown in a rotating wheel, and a dice game using a dice, that is, a game in which the game is started and the game result is obtained by the initiative of a dealer.

Further, the above-described "recording medium" refers to, in addition to a recording card such as an IC card, a magnetic card, a prepaid card and the like, any form of object as long as valuable information, such as an amount of money, can be stored therein.

With such a configuration, when the game player inputs, to the player terminal identification information input part, the player terminal identification information of the player terminal used by the game player for playing the game, the value adjustment device can obtain the updated valuable information stored in association with the player terminal identification information.

That is, it is possible for the value adjustment device to reliably obtain correct valuable information (updated valuable information) to which the game result of the table game is reflected. Hence, it is possible for the employee or the like to perform adjustment (offering of a gift, conversion to cash, or the like) based on the valuable information.

On this occasion, it is preferable that the updated valuable information transmitting part can also transmit the updated valuable information stored in the valuable information memory part to the updated valuable information reading devices. It is also preferable that each of the valuable information reading devices writes the updated valuable information transmitted from the updated valuable information transmitting part to the recording medium. It is further preferable that the value adjustment device reads the recording medium to which the updated valuable information is written.

With such a configuration, when the value adjustment device can read the updated valuable information (valuable information) stored in the recording medium, the adjustment is performed based on the updated valuable information that is read. Only when the value adjustment device cannot read the updated valuable information (valuable information) stored in the recording medium, the player terminal identification information is input from the player terminal identification information input part.

As described above, with the table game system according to an embodiment of the present invention, at the time of adjustment of the recording medium, it is possible to obtain the correct valuable information (updated valuable information) to which the game result of the table game is reflected. Therefore, it is possible for the game player to positively enjoy the benefits obtained by playing the table game.

BRIEF DESCRIPTION OF THE DRAWINGS

FIG. 17 is an exemplary diagram showing an example of a card information memory area provided in the administrative server; and FIG. 18 is an exemplary diagram showing an example of a history information memory area provided in the administrative server.

DESCRIPTION OF THE EMBODIMENTS

Hereinafter, a detailed description is given of embodiments of the present invention with reference to the drawings.

First, referring to FIG. 1 through FIG. 6, FIG. 17 and FIG. 18, a description is given of a game place where a table game system according to an embodiment of the present invention is provided.

(Structure of Game Place)

Figure 1:
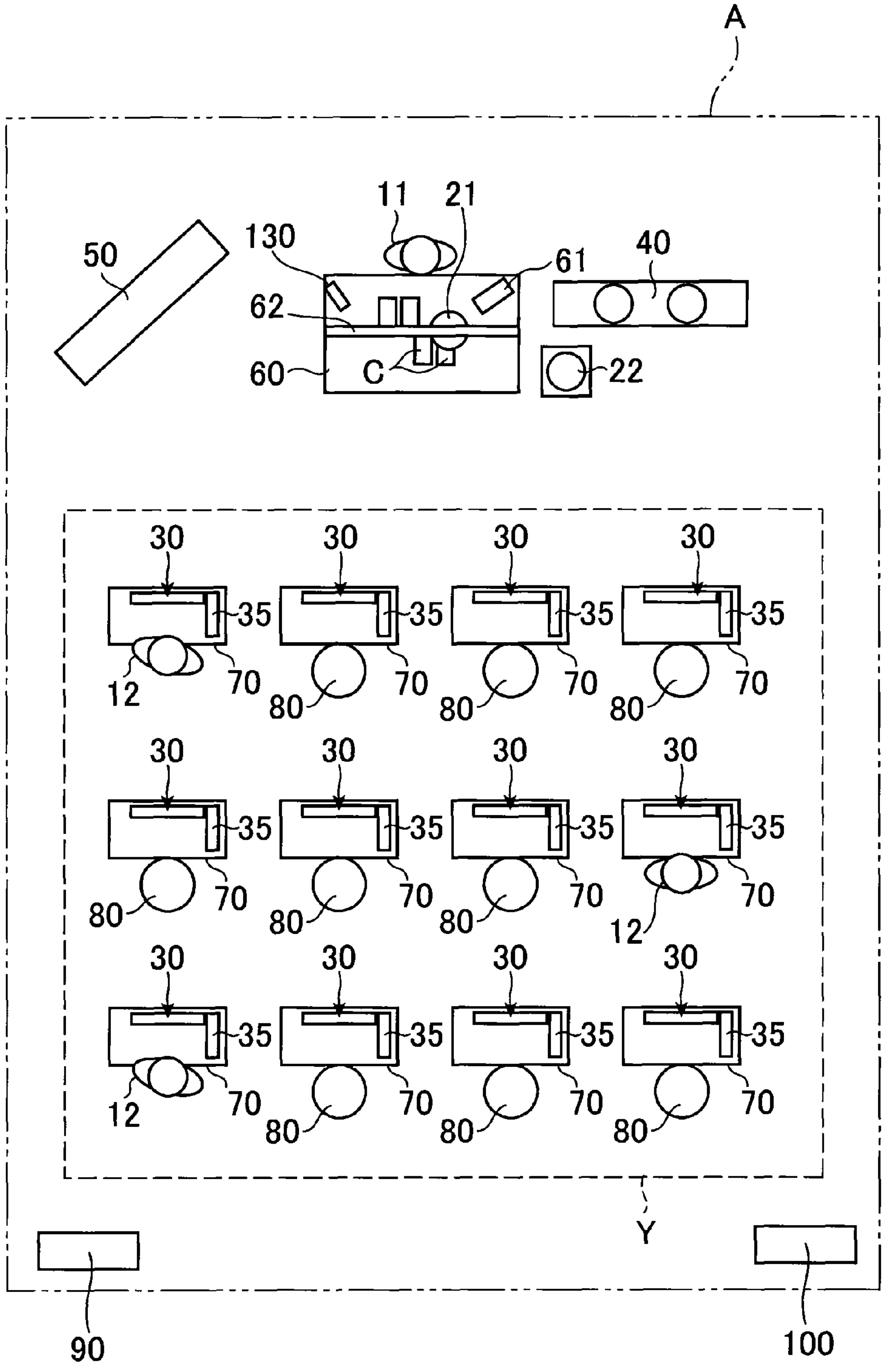
FIG. 1 is an exemplary plan view of a game place in a table game system according to an embodiment of the present invention.
Figure 2:
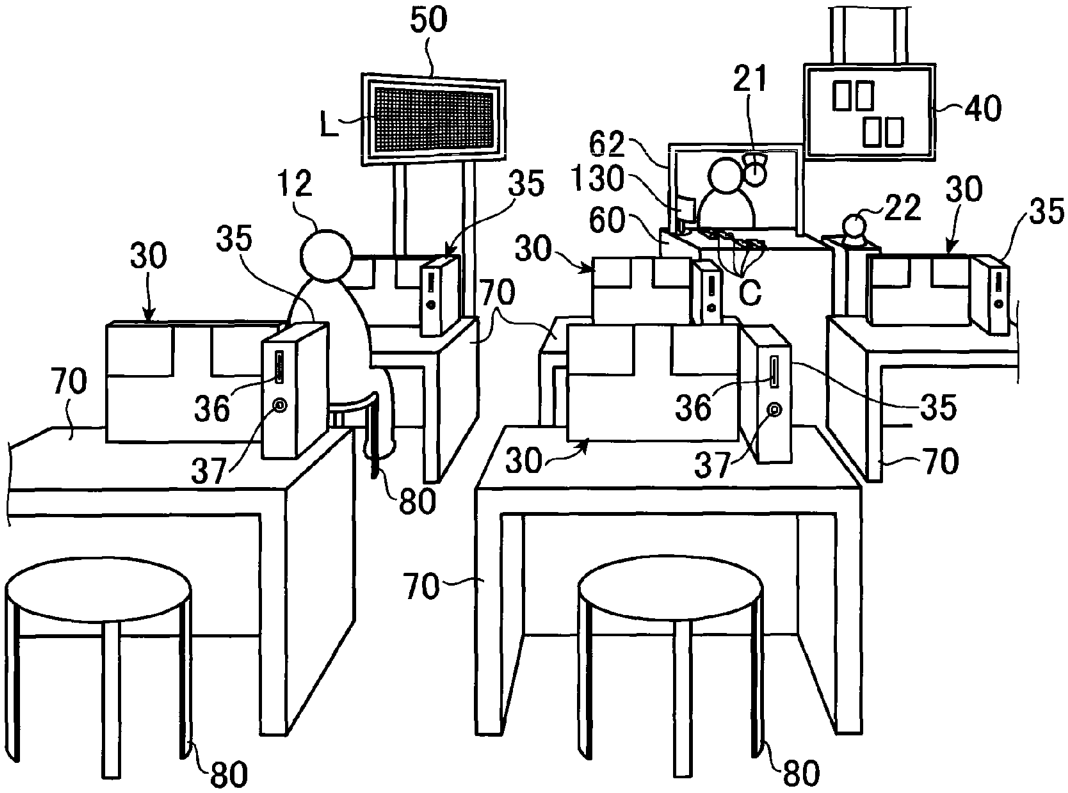
FIG. 2 is an exemplary diagram showing the game place of FIG. 1 in a three-dimensional manner.
Figure 4:
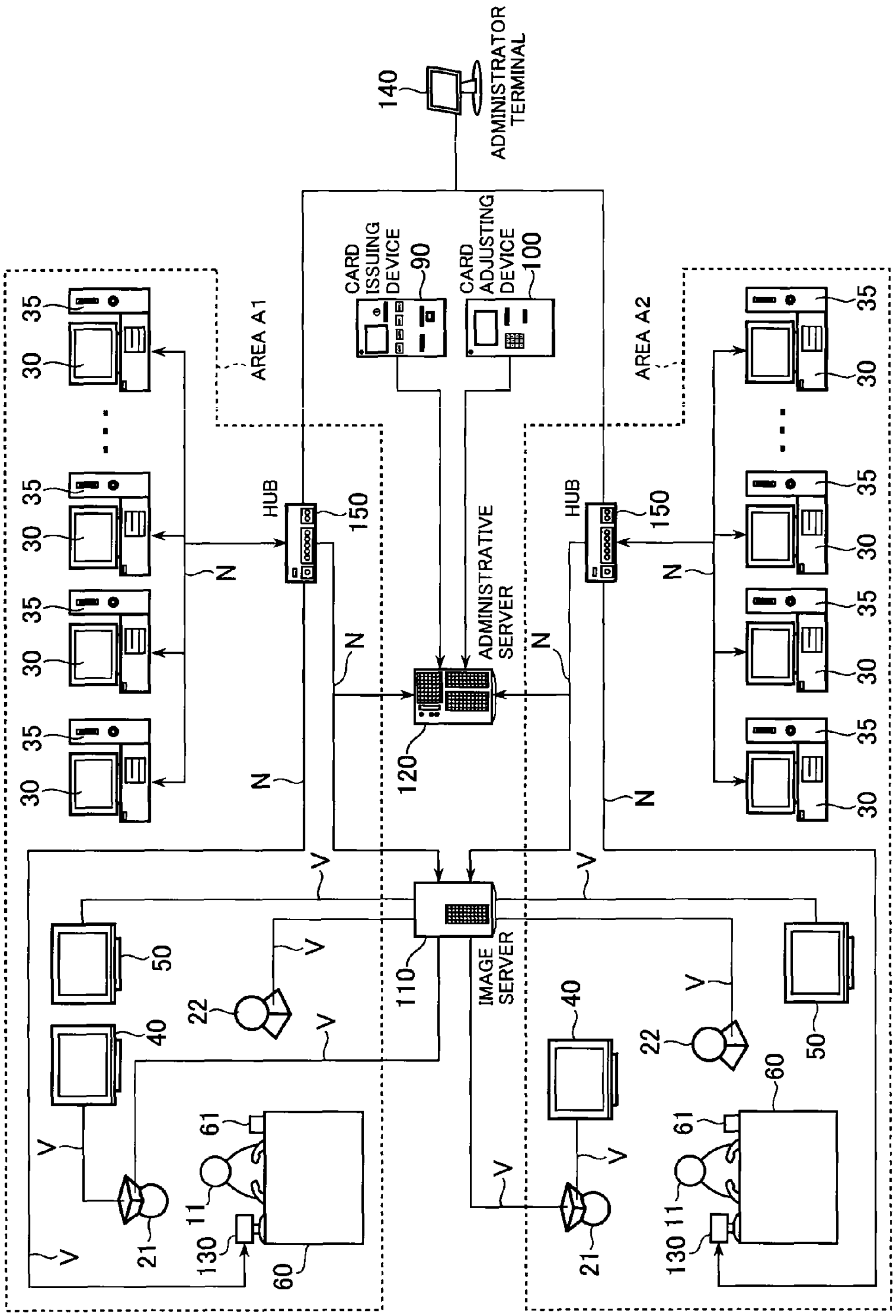
FIG. 4 is an exemplary system configuration diagram of the baccarat game system.

As shown in FIG. 1, FIG. 2 and FIG. 4, the game place according to this embodiment includes an area A1 where a baccarat game is performed, and an area A2 where another table game (for example, a roulette game or a dice game) is performed.

A game system in the baccarat game and a game system in another table game are different only in their game concepts, and adopt similar configurations in the other aspects. Hence, hereinafter, a description is mainly given of the baccarat game performed in the area A1 as an example of table game.

As shown FIG. 1 and FIG. 2, the area A1 includes a dealer's game table 60 on which the baccarat game is performed, a dealer terminal 130 provided on the dealer's game table 60, a game image capturing camera 21 that is provided on the dealer's game table 60 and captures the image of cards C (hereinafter referred to as "the game image") that are actually used in the baccarat game, a shoe image capturing camera 22 for capturing the image of a shoe 61 containing the cards C (hereinafter referred to as "the shoe image"), a plurality of game player tables 70 that are provided at a predetermined distant from the dealer's game table 60, and a plurality of player terminals 30 provided on the respective game player tables 70. It should be noted that the dealer's game table 60, the dealer terminal 130, and the player terminal 30 correspond to "dealer's game table", "dealer terminal", and "player terminal" described in the claims, respectively.

Additionally, as shown in FIG. 4, as in the area A1, the area A2 also includes the dealer's game table 60, the game image capturing camera 21, the plurality of game player terminals 70, and the player terminals 30 (see FIG. 4). For example, when the table game performed in the area A2 is a roulette game, the game image capturing camera 21 captures the game image, such as the image of a roulette wheel, the image of a ball thrown into the roulette wheel by a dealer 11, and the like. Further, when the table game is the roulette game, the shoe 61 is not required. Accordingly, it is possible to omit the shoe image capturing camera 22.

It should be noted that, in this embodiment, only the dealer 11 uses the dealer's game table 60. However, the dealer's game table 60 can be used by the dealer 11 and a small number of game players 12.

The dealer terminal 130 is formed by, for example, a PC (personal computer) including a CPU (central processing unit), a ROM, and a RAM (memory device), and can be operated only by the dealer 11. The dealer terminal 130 can input the game results and the face values of the cards, and can also perform an operation required for proceeding the game, such as closing of betting.

The game image capturing camera 21 and the shoe image capturing camera 22 are, for example, video cameras for capturing an image by using a CCD, and recognizing the cards C and the like in two-dimensional shapes.

The game image capturing camera 21 is attached to the dealer's game table 60, which is described later, via a supporting member 62. Additionally, the shoe image capturing camera 22 is placed on and fixed to a table or the like that is provided in the vicinity of the dealer's game table 60.

The game player tables 70 are tables that are used only by the game players 12. Twelve game player tables 70 in total, that is, four game player tables 70 in a horizontal direction and three game player tables 70 in a vertical direction, are arranged in an orderly manner in a game player space Y, which is provided at a predetermined distance from the dealer's game table 60. In addition, a chair 80 is arranged for each of the game player tables 70.

The player terminal 30 is formed by, for example, a PC (personal computer) including a CPU (central processing unit), a ROM, and a RAM (memory device), and includes a card reading device 35 and a display device that can display the shoe image and the game image captured by each of the capturing cameras (the game image capturing camera 21 and the shoe image capturing camera 22), the dividend information, the history of game results, and the like, and also can input betting information of the game player 12. It should be noted that the card reading device 35 corresponds to "valuable information reading device" described in the claims. Additionally, the player terminal 30 can be formed by, other than a PC, an interactive television, a mobile phone, or a mobile terminal such as a PDA.

Figure 3A:
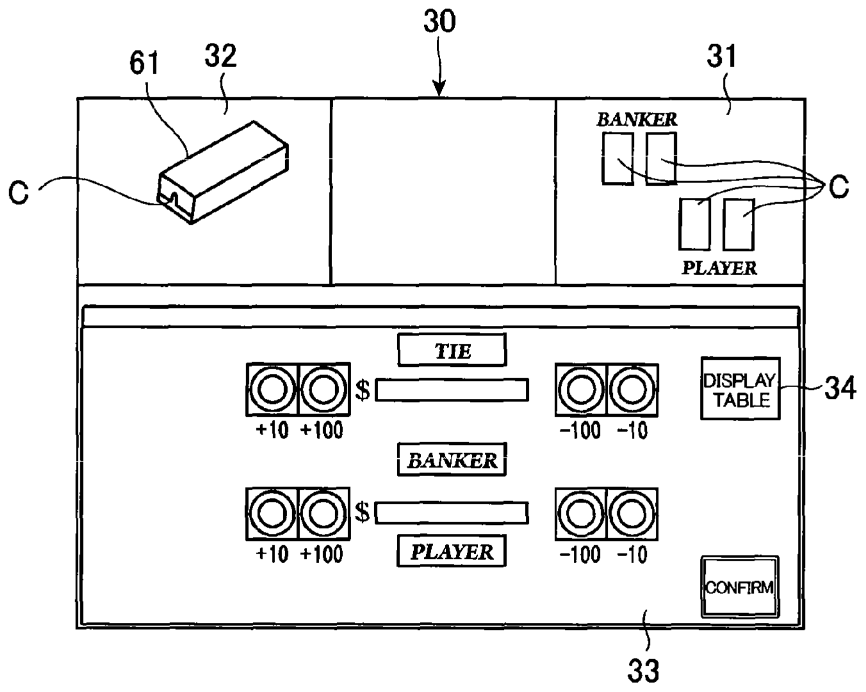
FIG. 3A is an exemplary diagram showing an example of a screen of a player terminal including a subscreen display region displaying a shoe.
Figure 3B:
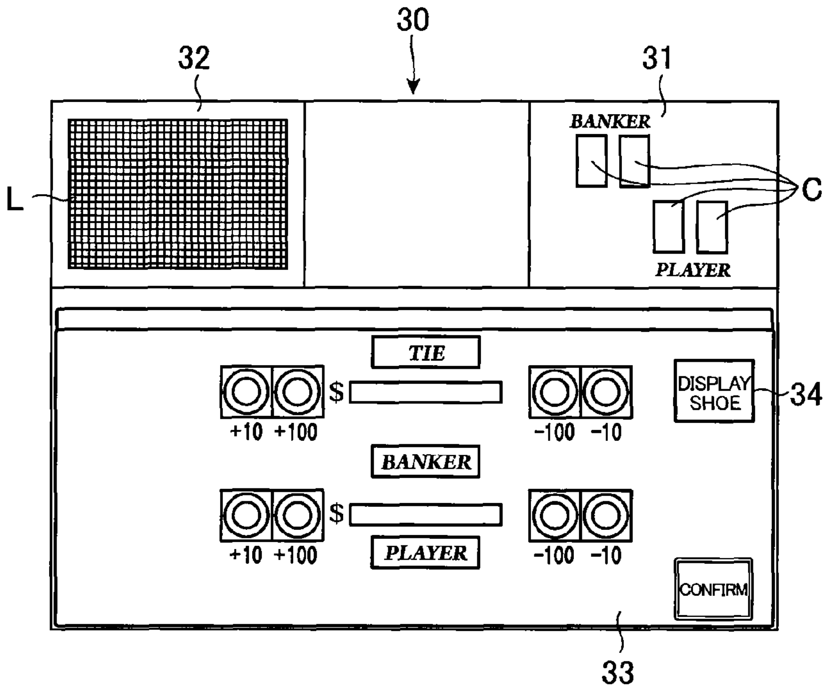
FIG. 3B is an exemplary diagram showing an example of a screen of the player terminal including the subscreen display region displaying a baccarat result table.

As shown in FIG. 3, a display portion of the display device of the player terminal 30 includes a main screen display region 31, a subscreen display region 32, and a BET screen display region 33.

The main screen display region 31 is a region that can display the game image (for example, the image of the cards C and the image of a roulette wheel) captured by the game image capturing camera 21.

Additionally, the subscreen display region 32 is a region that can display the shoe image captured by the shoe image capturing camera 22 and a baccarat result table L (the history of game results indicating a series of recent game result data) in a switching manner.

The BET screen display region 33 is formed by a touch panel display, and is a region that allows an input of betting information by the game player 12 by touching, with a finger or the like, the betting information displayed on the BET screen display region 33. In this embodiment, the input of the BET information is performed in the BET screen display region 33 by predicting one of Banker win, Player win, and Tie, and determining the kinds of tips and the number of tips.

Additionally, the BET screen display region 33 displays, in addition to the betting information, a selecting switch image 34 that imitates a switch and can switch between the shoe image and the baccarat result table L displayed in the subscreen display region 32. Further, the BET screen display region 33 displays a message such as "Please place a bet" in accordance with the progress of a game.

As shown in FIG. 2, the card reading device 35 is a device that reads and deletes card information (a card ID and the money information) stored in a recording card M, and writes the money information to the recording card M. Any form of card, such as a magnetic card and an IC card, can be adopted as the recording card M as long as the card allows writing and deleting of the card information (the card ID and the money information). It should be noted that the money information corresponds to "valuable information" in the claims.

Further, in this embodiment, a common ID card is used in the area A1 where the baccarat game is performed and in the area A2 where another table game is performed. Hence, for example, when the game player 12 playing the baccarat game in the area A1 ends playing of the baccarat game, and thereafter starts playing another table game in the area A2, the game player 12 can continuously use the recording card M, which is used in the area A1, also in the area A2.

In a front surface of the card reading device 35, there are provided a card insertion opening 36 for inserting the recording card M, and an adjustment button 37 for adjusting the money information when the game player 12 ends using of the player terminal 30 (ends playing the game). Additionally, the card reading device 35 incorporates a known card read/write device (not shown) having a read/write head (not shown) that can read and delete the card information stored in the recording card M, and can write the money information on the recording card M.

Although a detailed description is given later, when the recording card M in which the card information (the card ID and the money information) is stored is inserted into the card insertion opening 36, the read/write head reads the card information, and the card information is transmitted from the player terminal 30 to an administrative server 120, which is described later. Then, in this embodiment, among the card information stored in the recording card M, the money information is deleted by the read/write head without being stored in the card reading device 35, and the recording card M is ejected from the card insertion opening 36. Further, when the administrative server 120 receives the money information, the administrative server 120 updates and stores the money information in accordance with the winning/losing of the game. It should be noted that the administrative server 120 corresponds to "administrative server" described in the claims.

On the other hand, the adjustment of the money information is performed by inserting the recording card M from which the above-described money information is deleted, and operating the adjustment button 37.

When the game player 12 presses and operates the adjustment button 37, the money information currently stored is transmitted from the administrative server 120, and this money information is written on the recording card M by the read/write head. Then, the recording card M in which the money information is stored is ejected from the card insertion opening 36.

As mentioned above, in this embodiment, the management of the money information (for example, increasing and/or decreasing of the amount of money) is collectively performed by the administrative server 120.

Further, in this embodiment, the player terminal 30 is provided with the card reading device 35. However, the player terminal 30 itself can include a card reading device.

Figure 5:
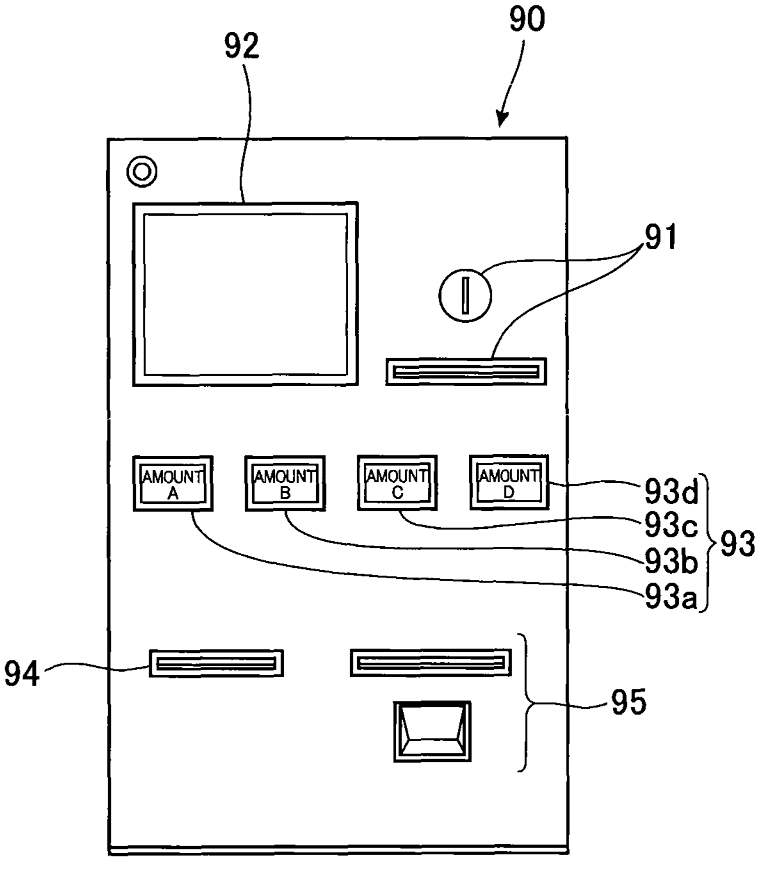
FIG. 5 is an exemplary front view showing an exemplary card issuing device according to one embodiment of the present invention.
Figure 6:
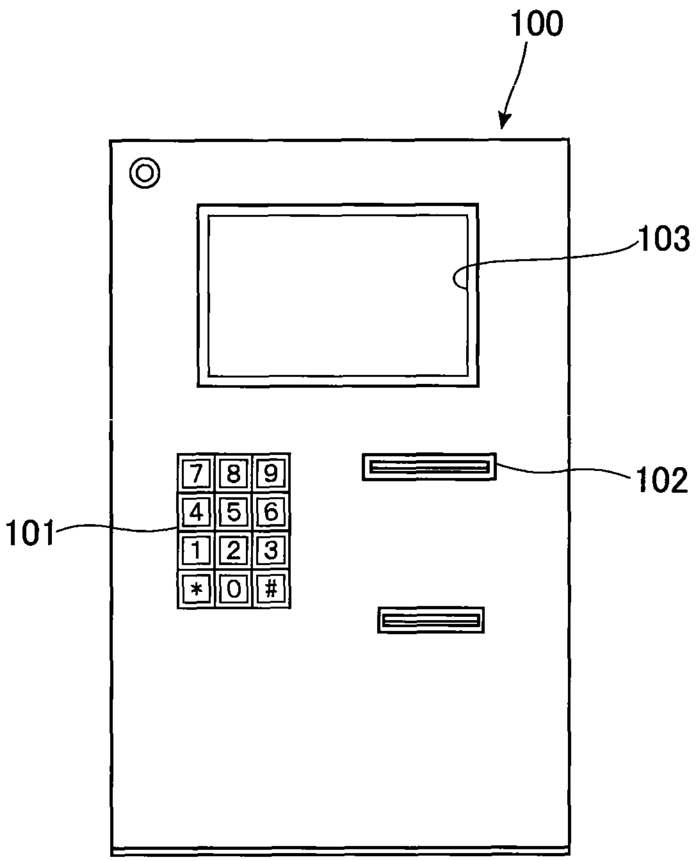
FIG. 6 is an exemplary front view showing an exemplary card adjustment device according to one embodiment of the present invention.

As shown in FIG. 4 through FIG. 6, in this embodiment, a predetermined number of card issuing devices 90 and a predetermined number of card adjustment devices 100 are installed at predetermine positions in the game place. It should be noted that the card adjustment device 100 corresponds to "value adjustment device" in the claims.

As shown in FIG. 5, the card issuing device 90 includes a CPU (central processing unit), a ROM, and a RAM (memory device). In a front surface of the card issuing device 90, there are provided money insertion openings 91 to which coins and bills can be inserted, a display device 92 that can display, for example, the total amount of money inserted from the money insertion openings 91, a plurality of card issuing buttons 93 having lamps, a card ejecting opening 94, a money return opening 95 that returns, for example, change. In addition, the card issuing device 90 incorporates a known card read/write device (not shown), which is similar to the card read/write device provided in the card reading device 35. As mentioned above, the common ID card is used in the area A1 where the baccarat game is performed and in the area A2 where another table game is performed. Hence, the game player 12 purchases the recording card M from the card issuing device 90 for playing the game in the area A1 or the area A2.

In the card issuing device 90 configured as described above, when money, such as coins and bills, is inserted into the money insertion openings 91, and any one of a card issuing button **93*a* for amount of money A, a card issuing button 93*b* for amount of money B, a card issuing button 93*c* for amount of money C, and a card issuing button 93*d*** for amount of money D is pressed and operated, the card read/write device is activated, and the card information (the card ID and the corresponding money information) is written to the recording card M, except for the case where the inserted money is insufficient.

When performing writing of the card information, the card issuing device 90 creates a card ID for identifying the recording card M by using a predetermined algorithm, and thereafter writes, to the recording card M, a coded card ID and the money information corresponding to the amount of money of the operated card issuing button 93.

When the card issuing device 90 ends writing of the card information, the card issuing device 90 transmits the card information to the administrative server 120, and thereafter ejects the recording card M from the card ejecting opening 94.

The card adjustment device 100 is a device used by the game player 12 when the game player 12 ends playing the game, and requests a staff member or the like of a house (hereinafter referred to as "the employee or the like") to offer a gift, money, or the like based on the money information (hereinafter referred to as "the exchanging operation"). The card adjustment device 100 can be operated only by the employee or the like.

The card adjustment device 100 includes a CPU (central processing unit), a ROM, and a RAM (memory device). As shown in FIG. 6, in a front surface of the card adjustment device 100, there are provided an identification information input device 101 that is formed by, for example, a numerical keypad or the like, and allows an input of identification information (for example, a password and the like) that only the employee or the like can know and a player terminal ID for identifying the player terminal 30, a card insertion opening 102, and a display device 103. Additionally, the card adjustment device 100 incorporates a known card read/write device (not shown), which is similar to the card read/write device provided in the card reading device 35. It should be noted that the player terminal ID and the identification information input device 101 correspond to "player terminal identification information" and "player terminal identification information input part" in the claims, respectively. Further, in this embodiment, the numerical keypad is used as an exemplary device that allows the input of each of the above-described identification information. However, another input device may be used.

The card adjustment device 100 is not activated unless the employee or the like inputs the identification information registered in advance, such as a password, from the identification information input device 101.

Although a detailed description is given later, after the activation of the card adjustment device 100, when the recording card M in which the card information (the card ID and the money information) is stored is inserted into the card insertion opening 102, the card read/write device reads the card information. When the card information is successfully read, the money information stored in the recording card M is displayed on the display device 103. The employee or the like performs the exchanging operation based on the displayed money information.

Additionally, in this embodiment, even when it is impossible to read the recording card M inserted into the card insertion opening 102 by the card read/write device, it is possible to obtain the money information from the administrative server 120, by asking the game player 12 of the player terminal ID of the player terminal 30 used by the game player 12, and, for example, inputting the player terminal ID from the identification information input device 101.

In this embodiment, the card adjustment device 100 can be used only by the employee or the like. However, it is possible to apply a configuration where the card adjustment device 100 can be used also by the game player 12. In this case, it is possible to integrally form the card issuing device 90 and the card adjustment device 100, instead of separately forming the card issuing device 90 and the card adjustment device 100.

As shown in FIG. 1 and FIG. 2, a large screen 40 and a large screen 50, each formed by a plasma display, a liquid crystal display, or the like, is installed at predetermined positions in the area A. The large screen 40 mainly displays the game image captured by the game image capturing camera 21. The large screen 50 mainly displays the baccarat result table L, which is the history of game results. It should be noted that the large screen 40 and the large screen 50 are also installed in the area A2 as in the area A1 (see FIG. 4).

As described above, in this embodiment, the dealer's game table 60 is arranged in the front as a platform in a classroom, whereas the player terminals 30 for the game players are arranged as desks in the classroom, thereby separating a conventional baccarat game table into the dealer's game table 60 and the game player tables 70.

Only the dealer 11 sits at the dealer's game table 60 so as to face toward the player terminals 30 for the game players, and proceeds the table game. This table game is a baccarat game, a roulette game, or the like that is actually performed on the dealer's game table 60.

Only those required for the dealer 11, such as the shoe 61, a dealer terminal 130, a Banker card placing position, a Player card placing position and the like, are provided on the dealer's game table 60. The dealer's game table 60 is not provided with a place or the like where the game player 12 places a bet, which is provided in a normal baccarat table, a roulette game, or the like. Thus, a small table can be used as the dealer's game table 60.

As a general rule, one game player 12 sits on the chair 80 in front of the game player table 70 so as to face toward the small dealer's game table 60, and can see a screen of the player terminal 30 for the game player, the large screens 40 and 50, and the dealer 11. By using the game player table 70 as a personal table, it is possible to offer a personal space for the game player 12.

As described above, in this embodiment, all of the game players do not sit at a single table, and a baccarat game table is separated into the dealer's game table 60 and the game player tables 70. Therefore, it is possible to offer a wide personal space, and the game players 12 can participate in the game with concentration or in a relaxed manner, without being distracted by other people's play.

Next, referring to FIG. 4, a description is given of an exemplary system configuration of the table game system according to this embodiment.

(System Configuration)

An image server 110 shown in FIG. 4 delivers the game image such as the image of the cards C and the roulette wheel captured by the game image capturing camera 21, and the shoe image captured by the shoe image capturing camera 22. It should be noted that, as a general rule, the image server 110 delivers the game image and the shoe image to the player terminals 30 on a real-time basis.

An administrative server 120 includes a CPU (central processing unit), a ROM, and a memory device such as a RAM. The administrative server 120 can calculate dividend information of the game player 12 from the betting information transmitted from the player terminal 30 and win/lose information transmitted from the dealer terminal 130, and create the baccarat result table L from the game results. It should be noted that the betting information, the win/lose information, and the dividend information correspond to "betting information", "game result information", and "dividend information" in the claims, respectively.

As shown in FIG. 17 and FIG. 18, the memory device provided in the administrative server 120 includes a card information memory area and a history information memory area. The card information memory area can store the card information (the card ID and the money information) of the recording card M, "the betting information" that is input from the player terminals 30 in the area A1 and the area A2, "the win/lose information" related to the game results that are input from the dealer terminal 130, and "the dividend information" calculated based on the betting information and the win/lose information. The history information memory area stores the game history for each game player 12 based on the card information, the betting information, the win/lose information, and the dividend information. It should be noted that the card information memory area corresponds to "valuable information memory part" described in the claims.

Here, referring to FIG. 17, a description is given of the card information memory area provided in the administrative server 120.

As shown in FIG. 17, the card information memory area includes areas to which "date and time of issue", "player terminal ID", "amount of bet", "place of bet", "game result", "win/lose information", "dividend information", and "money information" are written in association with "card ID".

The "card ID" is the area for storing an ID that is given to each recording card M when the recording card M is issued by the card issuing device 90.

The "date and time of issue" is the area for storing the date and time when the recording card M is issued by the card issuing device 90.

The "player terminal ID" is the area for storing an ID that is given to each player terminal 30 when the recording card M is inserted into the card reading device 35 of the player terminal 30.

The "amount of bet" is the area for temporarily storing the amount of money that is bet by the game player 12. The amount of money stored in the "amount of bet" is deleted when the game to which the bet is placed ends.

The "place of bet" is the area for temporarily storing the place (for example, "PLAYER", "BANKER" or "TIE") to which the game player 12 places a bet. The "game result" is the area for temporarily storing the result of a game (for example, "PLAYER", "BANKER" or "TIE") determined when the dealer 11 opens the cards C. The information stored in the "game result" is deleted when the game to which the bet is placed ends, as in the "amount of bet".

The "win/lose information" is the area for temporarily storing information (for example, "WIN", "LOSE" or the like) determined by comparing the game result with the place to which the game player 12 places a bet. The information stored in the "win/lose information" is deleted when the game to which the bet is placed ends, as in the "amount of bet".

The "dividend information" is the area for temporarily storing information calculated based on the betting information and the win/lose information. The information stored in the "dividend information" is deleted when the game to which the bet is placed ends, as in the "amount of bet".

The "money information" is the area for storing the amount of money that the game player 12 has at the present moment. In addition, the amount of money stored in the "money information" is updated based on the dividend information.

It should be noted that the above-described "amount of bet" and "place of bet" correspond to "betting information" described in the claims.

Further, in this embodiment, the recording card M is valid only on the business day on which the recording card M is purchased, and the information stored in the card information memory area is all deleted at the end of business hours. For example, the recording card M purchased on the previous business day is invalid (cannot be used) on the next business day.

An administrator terminal 140 shown in FIG. 4 is formed by, for example, a PC (personal computer), as in the player terminal 30 and the dealer terminal 130, and can be operated only by an administrator (not shown). The administrator terminal 140 allows administrative operations, such as interruption in the case where a system trouble occurs, and correction of game result inputs by the dealer 11.

In this embodiment, the game image capturing camera 21, the player terminals 30 each having the card reading device 35, the large screen 40, the large screen 50, and the dealer terminal 130 are installed in each of the area A1 and the area A2.

In this embodiment, the player terminals 30 and the dealer terminal 130, which are provided in each area, the card issuing device 90, the card adjustment device 100, the administrative server 120, and the administrator terminal 140 are connected to each other via a network N and a hub 150. It should be noted that the network N corresponds to "communication line" described in the claims.

Additionally, the game image capturing camera 21 is connected by wiring to the image server 110 and the large screen 40. The shoe image capturing camera 22 is connected by wiring to the image server 110. The large screen 50 is connected by wiring to the image server 110.

In the table game system configured as described above, the game image of the cards C or the roulette wheel during the game of the table game that is actually performed is captured by the game image capturing camera 21, and the game image is transmitted to each large screen 40 as video signals V, thereby displaying the game image on a real-time basis. Additionally, at the same time, the game image is transmitted from each game image capturing camera 21 to the image server 110 as the video signals V, and also to each of the player terminals 30, the dealer terminal 130, and the administrator terminal 140 via the network N and the hub 150, thereby displaying the status (the game image) of the table game. Namely, in this embodiment, the game image performed on the dealer's game table 60 is captured, and displayed on the player terminals 30 on the game player tables 70 and the like on a real-time basis. It is preferable that the game image captured then is a moving image. However, the game image may be consecutive still images.

Further, the shoe image capturing camera 22 for capturing the status of the shoe 61, which holds unused cards, is installed in the area A1. The image captured by this camera is transmitted to the image server 110 as the video signals V, and displayed as the shoe image on each of the player terminals 30 and the dealer terminal dealer terminal 130 in the area A1, and the administrator terminal 140 via the network N and the hub 150 on a real-time basis.

When issuing the recording card M, the card issuing device 90 transmits, to the administrative server 120, the card information (the card ID and the money information) stored in the recording card M via the network N and the hub 150. On the other hand, the administrative server 120 that receives the transmitted card information stores the received information in the card information memory area.

When the recording card M is inserted into the card reading device 35, the player terminal 30 transmits, to the administrative server 120 via the network N and the hub 150, the unique player terminal ID for identifying the player terminal 30, the card ID and the like stored in the recording card M. Additionally, when the recording card M is inserted into the card reading device 35 and the card information is read, the money information of the card information is deleted from the recording card M without being stored in the card reading device 35.

On the other hand, the administrative server 120 that receives the player terminal ID and the like stores these sets of information in the card information memory area.

Further, when the betting information is input to the player terminal 30, the player terminal 30 transmits the betting information to the administrative server 120 via the network N and the hub 150. On the other hand, the administrative server 120 that receives the betting information calculates the dividend information based on the betting information and the win/lose information that is input from the dealer terminal 130, and updates, based on the calculated dividend information, each money information stored in association with the card ID.

The player terminals 30 receive the dividend information calculated by the administrative server 120, and receive the game result or dividends as electronic information in case of win.

When the recording card M is inserted into the card adjustment device 100 and the recording card M can be read, the card ID stored in the recording card M is transmitted to the administrative server 120 via the network N and the hub 150. On the other hand, the administrative server 120 that receives the card ID searches for the money information corresponding to the card ID. When the corresponding money information is stored in the card information memory area, the administrative server 120 transmits the money information to the card adjustment device 100 via the network N and the hub 150.

As described above, in this embodiment, the card information (the card ID and the money information), the betting information, the dividend information, and the game history of each game player 12 are collectively stored (updated) by the administrative server 120. Therefore, by referring to the various kinds of information stored in the administrative server 120, it is possible for the house to, for example, offer the information to the game player 12 as the score, or use the information for calculating the hourly sale and the daily sale, and the like.

Next, referring to FIG. 7 through FIG. 18, a description is mainly given of an exemplary operation of the baccarat game system performed in the area A1. It should be noted that, since the operation of another table game system performed in the area A2 is substantially the same as the operation of the baccarat game system, a description thereof is omitted except when necessary.

(Administrator Terminal Control)

Figure 7:
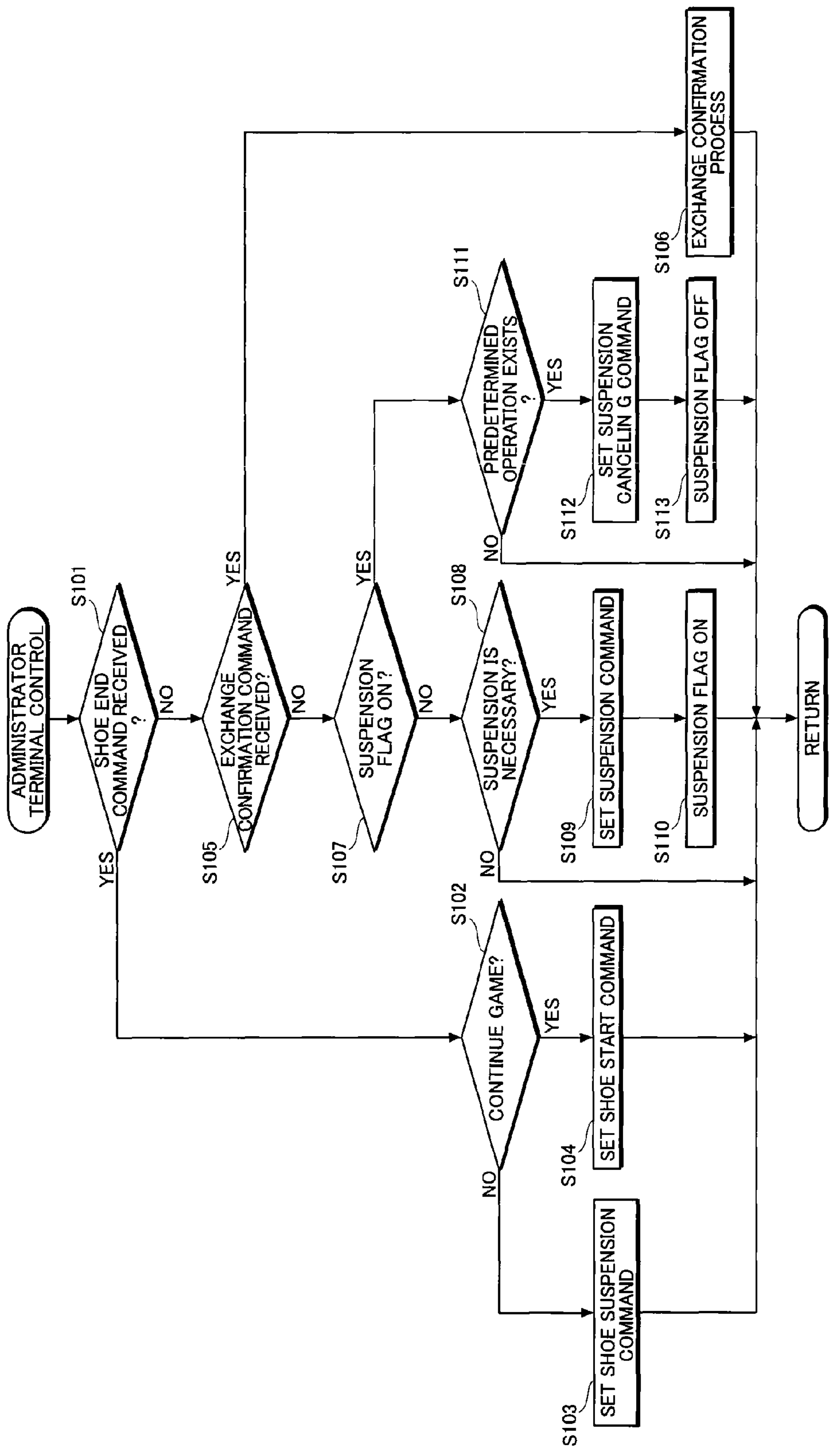
FIG. 7 is an exemplary flowchart showing a control process in an administrator terminal according to one embodiment of the present invention.

Referring to FIG. 7, a description is given of an exemplary control process in the administrator terminal 140.

(Step S101)

A CPU forming the administrator terminal 140 (hereinafter referred to as "the administrator terminal CPU") first determines, in step S101, whether or not a shoe end command transmitted from the dealer terminal 130 is received. The shoe end command is set in step S306-17 in a shoe process by the dealer terminal 130, which is described later. The shoe end command is the command that is transmitted to the administrator terminal 140 when the dealer 11 operates the dealer terminal 130 in the case where the cards C set in the shoe 61 are all pulled out.

When the administrator terminal CPU receives the shoe end command, the process proceeds to step S102, and when the administrator terminal CPU does not receive the shoe end command, the process proceeds to step S105.

(Step S102)

In step S102, the administrator terminal CPU determines whether or not to continue the game, that is, whether the administrator permits the dealer 11 to set new cards C to the shoe 61. Such permission can be made by operating a keyboard or the like of the administrator terminal 140.

When the administrator terminal CPU does not make the permission as described above, the process proceeds to step S103, and when the administrator terminal CPU makes the permission, the process proceeds to step S104.

(Step S103)

In step S103, the administrator terminal CPU transmits a shoe suspension command to the dealer terminal 130.

As described later, when the shoe suspension command is received, the dealer terminal 130 suspends the proceeding of the subsequent baccarat game (step S5306-1).

After performing the process of step S103, the administrator terminal CPU ends the control process in the administrator terminal 140.

(Step S104)

In step S104, the administrator terminal CPU performs a process of transmitting a shoe start command to the dealer terminal 130.

As described later, when the shoe start command is received, the dealer terminal 130 can perform the subsequent processes (the processes of step S306-6 and the subsequent processes) in the shoe process (S306).

After performing the process of step S104, the administrator terminal CPU ends the control process in the administrator terminal 140.

(Step S105)

In step S105, the administrator terminal CPU determines whether or not an exchange confirmation command is received from the administrative server 120. The exchange confirmation command is the command transmitted from the administrative server 120 in step S222-4 and step S222-8 in a game end process in the administrative server 120, which is described later. The exchange confirmation command is transmitted when the player terminal ID or the card ID of the recording card M that the game player 12 owns is not stored in the card information memory area. Such an exchange confirmation command is transmitted from the administrative server 120 when, for example, the employee or the like inserts, into the card adjustment device 100, a forged recording card M (the recording card M that is not issued by the card issuing device 90, that is, the recording card M to which a predetermined card ID is not given).

When the administrator terminal CPU determines that the exchange confirmation command is received, the process proceeds to step S106, and when the administrator terminal CPU determines that the exchange confirmation command is not received, the process proceeds to step S107.

(Step S106)

In step S106, the administrator terminal CPU performs a process of displaying a message such as "Please confirm the ID card inserted into the card adjustment device" on a display device of the administrator terminal 140 (exchange confirmation process). In such a case, the administrator approaches the card adjustment device 100, and confirms the inserted recording card M.

After performing the above-described exchange confirmation process, the administrator terminal CPU ends the administrator terminal control process.

(Step S107)

In step S107, the administrator terminal CPU determines whether or not an interruption flag is set in a memory area (hereinafter referred to as "the administrator terminal memory area") of a RAM or the like of the administrator terminal 140. The interruption flag is set in step S118, which is described later. The interruption flag is set when the administrator determines that it is necessary to interrupt the proceeding of the baccarat game in the case where, for example, the dealer 11 commits fraud.

When the administrator terminal CPU determines that the interruption flag is not set, the process proceeds to step S108, and when the administrator terminal CPU determines that the interruption flag is set, the process proceeds to step S111.

(Step S108)

In Step S108, the administrator terminal CPU determines whether or not interruption is necessary, more specifically, whether or not predetermined information is input by operating the keyboard or the like of the administrator terminal 140 in a case where the administrator determines that it is necessary to suspend the proceeding of the game. In this embodiment, such an operation of suspension is made when, for example, the game player 12 or the employee or the like finds fraud by the dealer 11, and reports the fraud.

When the administrator terminal CPU determines that the above-described input is made, the process proceeds to step S109, and when the administrator terminal CPU determines that the above-described input is not made, the administrator terminal CPU ends the control process in the administrator terminal 140.

(Step S109)

In Step S109, the administrator terminal CPU performs a process of transmitting the interruption command to the player terminals 30 and the dealer terminal 130.

As described later, when the player terminals 30 and the dealer terminal 130 receive the interruption command, a message such as "Please wait for a moment" is displayed on respective display devices. While such a message is displayed, an operation related to the baccarat game is disabled.

After the administrator terminal CPU performs the process of step S109, the process proceeds to step S110.

(Step S110)

In step S110, the administrator terminal CPU performs a process of setting the interruption flag in the administrator terminal memory area, and thereafter ends the control process in the administrator terminal 140.

(Step S111)

In step S111, the administrator terminal CPU determines whether or not a predetermined operation is performed for canceling the interruption flag (canceling an interrupted state) that is set in the administrator terminal memory area, for example, whether or not predetermined information is input by operating the keyboard or the like of the administrator terminal 140. In this embodiment, such an operation of canceling the interrupted state is performed after, for example, the administrator confirms fraud, when the game player 12 reports the fraud by the dealer 11, and the game is interrupted.

When the administrator terminal CPU determines that the above-described predetermined information is input, the process proceeds to step S112, and when the administrator terminal CPU determines that the above-described predetermined information is not input, the administrator terminal CPU ends the control process in the administrator terminal 140.

(Step S112)

In step S112, the administrator terminal CPU performs a process of transmitting an interruption canceling command to the player terminals 30 and the dealer terminal 130.

As described later, when the player terminals 30 and the dealer terminal 130 receive the interruption canceling command, a message such as "You can play game" is displayed on the respective display devices, and an operation of the dealer terminal 130 that has been disabled is enabled.

After the administrator terminal CPU performs the process of step S112, the process proceeds to step S113.

(Step S113)

In Step S113, the administrator terminal CPU performs a process of turning OFF the interruption flag that is set in the administrator terminal memory area, and thereafter ends the control process in the administrator terminal 140.

(Administrative Server Control Process)

Figure 8:
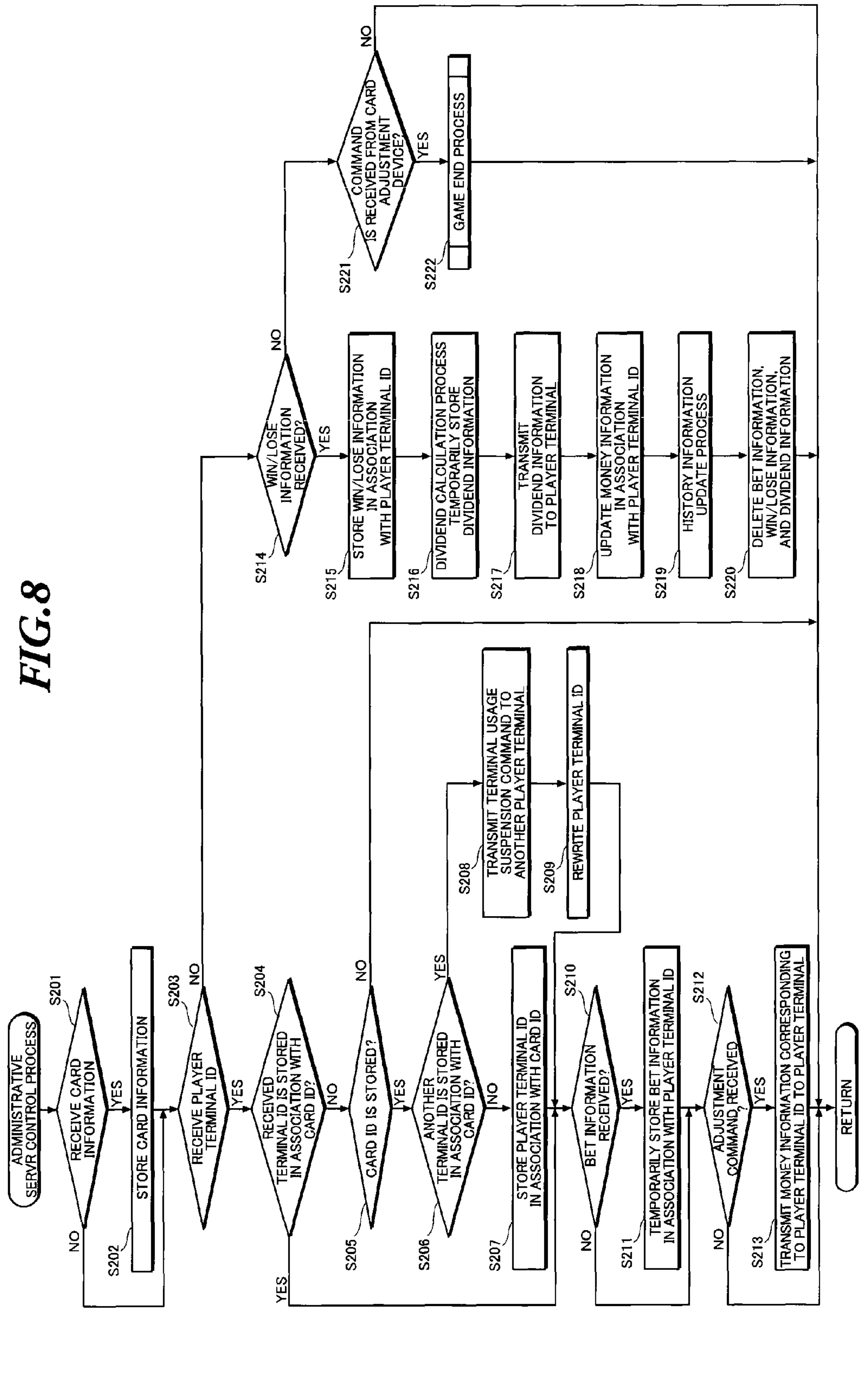
FIG. 8 is an exemplary flowchart showing a control process in an administrative server according to one embodiment of the present invention.

Referring to FIG. 8, a description is given of an exemplary control process in the administrator terminal 140.

(Step S201)

First, in step S201, a CPU forming the administrative server 120 (hereinafter referred to as "the administrative server CPU") determines whether or not the card information (the card ID and the money information) is received from the card issuing device 90. The card information is transmitted from the card issuing device 90 in step S506 of a control process in the card issuing device 90, when issuing the recording card M.

It should be noted that, as described above, in this embodiment, the card information including the money information is collectively managed by the administrative server 120. In other words, while the game player 12 is playing the table game, the money information (including an increase and decrease in the amount of money) is stored only in the administrative server 120, and is not stored in the recording card M or stored in the player terminals 30 and the card reading device 35.

When the administrator server CPU receives the card information, the process proceeds to step S202, and when the administrative server CPU determines that the card information is not received, the process proceeds to step S203.

(Step S202)

In step S202, the administrative server CPU performs a process of storing, in the card information memory area, the card information (the card ID and the money information) transmitted from the card issuing device 90. For example, as shown in FIG. 17, when the card ID and the money information transmitted from the card issuing device 90 are "**01" and "$10000", respectively, "**01" and "$10000" are written in the areas of "card ID" and "money information" of the card information memory area, respectively.

After the administrative server CPU performs the above-described storing process, the process proceeds to step S203.

(Step S203)

The administrative server CPU determines whether or not the player terminal ID is received. The player terminal ID is for identifying each of the player terminals 30. The player terminal ID is transmitted from the player terminal 30 to the administrative server 120, in each of the following cases: when the betting information is input (step S412); when the recording card M is inserted into any one of the card reading devices 35 for the first time, after the recording card M is purchased (step S406-2); when the game player 12 inserts the recording card M into the card reading device 35, and presses and operates the adjustment button 37 (step S406-6); and when the game is played by using the player terminal 30 and when playing of the game is newly started by using another player terminal 30 (step S406-9).

When the administrative server CPU receives the player terminal ID, the process proceeds to step S204, and when the administrative server CPU does not receive the player terminal ID, the process proceeds to step S214.

(Step S204)

In step S204, the administrative server CPU determines whether or not the player terminal ID received in the process of step S203 is stored in the card information memory area in association with the card ID.

As shown in FIG. 17, for example, when the received player terminal ID is "**77", and a certain ID (for example, "*758") is stored in the area of "card ID", the administrative server CPU determines that the player terminal ID is stored in the card information memory area in association with the card ID. Such determination is made in the case where the game is currently performed by using the recording card M.

On the other hand, when the received player terminal ID is "*999" (not shown), and the card ID is not stored in the area of "card ID", the administrative server CPU determines that the player terminal ID is not stored in the card information memory area in association with the card ID. Such determination is made when the recording card M is inserted, and the game is not played yet (when the recording card M is not inserted into the card reading device 35). Specifically, such determination is made when the player terminal ID and the card information (the card ID and the money information) are transmitted in step S406-2 or step S406-9 in a card reading device control process in the player terminal 30, which is described later. It should be noted that, as described above, in each of the above-described steps, the card ID is transmitted together with the player terminal ID from the player terminal 30 to the administrative server 120**.

When the administrative server CPU determines that the player terminal ID is not stored in association with the card ID, the process proceeds to step S205, and when the administrative server CPU determines that the player terminal ID is stored in association with the card ID, the process proceeds to step S210.

(Step S205)

In step S205, the administrative server CPU determines whether or not the card ID transmitted in the process of step S406-2 and step S406-9 is stored in the card information memory area. The cases where the card ID exists include, for example, the case where the transmitted card ID is "**01", "01" is already stored in the area of "card ID" of the card information memory area shown in FIG. 17**. On the other hand, the cases where the card ID does not exist include, for example, the case where the recording card M is expired, and the case where the recording card M is forged.

When the administrative server CPU determines that the card information memory area stores a card ID that matches the card ID transmitted from the player terminal 30, the process proceeds to step S206. When the administrative server CPU determines that the card information memory area does not store a card ID that matches the card ID transmitted from the player terminal 30, the administrative server CPU ends the control process in the administrative server 120. It should be noted that, when the card ID transmitted from the player terminal 30 is not stored in the card information memory area, it is preferable that a signal (for example, a caution signal) indicating the fact is transmitted to the administrator terminal 140 or the like, and the administrator or the like confirms whether or not the recording card M is forged.

(Step S206)

In step S206, the administrative server CPU determines whether or not a player terminal ID that is different from the player terminal ID received in the process of step S203 is already stored in the card information memory area in association with the card ID. The determination result is YES when, for example, the game is played by using the player terminal 30, and playing of the game is newly started by using a different player terminal 30 (step S406-9). On the other hand, the determination result is NO when the recording card M is inserted into the card reading device 35 for the first time after the purchase of the recording card M (step S406-2).

When the administrative server CPU determines that the different player terminal ID is not already stored in the card information memory area in association with the card ID, the process proceeds to step S207. On the other hand, when the administrative server CPU determines that the different player terminal ID is already stored in the card information memory area in association with the card ID, the process proceeds to step S208.

(Step S207)

In step S207, the administrative server CPU performs a process of writing the player terminal ID in association with the card ID. Referring to FIG. 17, in the state where "**01" and "$10000" are already written in the areas of "card ID" and "money information" of the card information memory area, respectively, and nothing is written in the other areas ("player terminal ID" and the like), when the player terminal ID received in the process of step S203 is, for example, "*999", the administrative server CPU writes "***999" to the area of "player terminal ID", which is one of the above-described other areas.

After the administrative server CPU performs the process of writing the player terminal ID, the process proceeds to step S210.

(Step S208)

In step S208, the administrative server CPU performs a process of transmitting a terminal usage suspension command to the above-described different player terminal 30. As described later, the player terminal 30 that receives the terminal usage suspension command turns a terminal in-use command OFF in step S420 of a control process in the player terminal 30, that is, allows any game player 12 to use the different player terminal 30.

After the administrative server CPU transmits the terminal usage suspension command, the process proceeds to step S209.

(Step S209)

In step S209, the administrative server CPU performs a process of rewriting the information written in the area of "player terminal ID" of the card information memory area to the player terminal ID received in the process of step S203. Referring to FIG. 17, in the state where "*758" and "77" are written in the areas of "card ID" and "player terminal ID" of the card information memory area, when the player terminal ID received in the process of step S203 is, for example, "*999", the administrative server CPU performs a process of overwriting "**77" written in the area of "player terminal ID" with "*999".

After the administrative server CPU performs the process of rewriting the player terminal ID, the process proceeds to step S210

(Step S210)

In step S210, the administrative server CPU determines whether or not the betting information transmitted from the player terminal 30 is received. The betting information is input in the process of step S412 in the control process in the player terminal 30.

When the administrative server CPU determines that the betting information is received from the player terminal 30, the process proceeds to step S211, and when the administrative server CPU determines that the betting information is not received from the player terminal 30, the process proceeds to step S212.

(Step S211)

In step S211, the administrative server CPU performs a process of storing, in the areas of "amount of bet" and "place of bet" of the card information memory area, the betting information (the amount of bet and the place of bet) in association with the player terminal ID (card ID) received in the process of step S203. Referring to FIG. 17, in the state where "*875" and "33" are written in the areas of "card ID" and "player terminal ID" of the card information memory area, respectively, when the amount of bet and the place of bet received in the process of step S211** are "$10000" and "PLAYER", respectively, the administrative server CPU performs a process of storing "$10000" and "PLAYER" in the areas of "amount of bet" and "place of bet", respectively.

After the administrative server CPU stores the betting information in the card information memory area, the process proceeds to step S212.

(Step S212)

In step S212, the administrative server CPU determines whether or not an adjustment command that is input from the player terminal 30 is received. The adjustment command is transmitted from the player terminal 30 to the administrative server 120 when the game player 12 operates the adjustment button 37 in the state where the recording card M is inserted into the card reading device 35 in step S406-6 in the card reading device control process.

When the administrative server CPU determines that the adjustment command is received, the process proceeds to step S213, and when the administrative server CPU determines that the adjustment command is not received, the administrative server CPU ends the control process in the administrative server 120.

(Step S213)

In step S213, the administrative server CPU performs a process of transmitting, to the player terminal 30 whose adjustment button 37 is operated, the money information stored in association with the corresponding player terminal ID. Referring to FIG. 17, in the state where "**55" and "$90000" are written in the areas of "player terminal ID" and "money information" of the card information memory area, respectively, when the "player terminal" received in the process of step S211 is "55", the administrative server CPU transmits, to the corresponding player terminal 30 (the player terminal 30 whose "player terminal ID" is "55"), the money information "$90000" stored in the area of "money information" at the time of operation of the adjustment button 37 via a transmitting means (not shown) provided in the administrative server 120**. The transmitting means can be formed by, for example, a known transmit port.

After the administrative server CPU performs the process of transmitting the money information, the administrative server CPU ends the control process in the administrative server 120.

(Step S214)

In step S214, the administrative server CPU determines whether or not the win/lose information transmitted from the dealer terminal 130 is received. The win/lose information is transmitted when the dealer 11 inputs the win/lose information to the dealer terminal 130 in step S306-15 in the shoe process in the dealer terminal 130. Additionally, on this occasion, in addition to the win/lose information, the dealer terminal 130 also transmits the corresponding player terminal ID. When the administrative server CPU determines that the win/lose information is received, the process proceeds to step S215, and when the administrative server CPU determines that the win/lose information is not received, the process proceeds to step S221.

(Step S215)

In step S215, the administrative server CPU performs a process of temporarily storing, in the card information memory area, the win/lose information (the game result and the result of win/lose) received in the process of step S214 in association with the player terminal ID of the player terminal 30 from which the bet is placed. Referring to FIG. 17, in the state where "*927" and "PLAYER" are written in the areas of "player terminal ID" and "place of bet" of the card information memory area, respectively, when the information received in the process of step S214 is "*927", "PLAYER", and "WIN" for the player terminal ID, the game result, and the result of win/lose, respectively, the administrative server CPU writes "PLAYER" and "WIN" in the areas of "game result" and "win/lose information", respectively, in association with the corresponding player terminal ID (player terminal ID "***927").

After the administrative server CPU performs the process of storing the win/lose information, the process proceeds to step S216.

(Step S216)

In step S216, the administrative server CPU performs a process of calculating the dividend for each player terminal ID based on the betting information stored in the process of step S211 and the win/lose information stored in the process of step S215 (dividend calculation process). On this occasion, the administrative server CPU also performs a process of temporarily storing the calculated dividend information in the card information memory area in association with the player terminal ID. Referring to FIG. 17, in the case where "***927", "$10000", and "WIN" are written in the "player terminal ID", "amount of bet", and "game result" of the card information memory area, respectively, the administrative server CPU performs the following calculation to obtain the dividend of the game: "$10000" (amount of bet)×2=+$20000, and writes thus obtained "$20000" to the area of "dividend information". It should be noted that the administrative server CPU performing the process of step S216 corresponds to "dividend information calculating part" described in the claims.

After the administrator terminal CPU performs the dividend calculation process, the process proceeds to step S217.

(Step S217)

In step S217, the administrative server CPU performs a process of transmitting the dividend information calculated in the process of step S216 to the corresponding player terminal 30 (the player terminal 30 of the game player 12 who has correctly predicted the result). With the transmission of the dividend information, the win/lose information (indication that the prediction of the result was correct) and the dividend information are displayed on the display device of the player terminal 30 of the game player who has correctly predicted the result. On the other hand, the win/lose information (indication that the prediction of the result was incorrect) is displayed on the player terminal 30 of the game player 12 who has incorrectly predicted the result (step S418).

After the administrative server CPU performs the process of transmitting the dividend information, the process proceeds to step S218.

(Step S218)

In step S218, the administrative server CPU performs a process of updating the money information (increasing and decreasing the amount of money) for each player terminal ID based on the dividend information calculated in the process of step S216. For example, in the state where "$100000" is written in the area of "money information" of the card information memory area, when the calculated dividend information is "+$20000", the administrative server CPU rewrites "$100000" that is stored in the area of "money information" to "$120000". It should be noted that the rewritten money information corresponds to "updated valuable information" described in the claims. Additionally, it should be noted that the administrative server CPU that updates the above-described money information corresponds to "valuable information updating part" described in the claims.

After the administrative server CPU performs the process of updating the money information, the process proceeds to step S219.

(Step S219)

In step S219, in order to save the information (the betting information, the win/lose information, the dividend information, and the like) related to the game of each game player 12 as history information, the administrative server CPU performs a process of storing the above-described information in the history information memory area in an updating manner (history information updating process). Specifically, as shown in FIG. 18, the administrative server CPU writes the information related to the game that is performed this time to the areas of "date and time", "player terminal ID", "amount of bet", "place of bet", "game result", "win/lose information", and "money information" of the history information memory area in a time-oriented manner in association with "card ID".

After the administrative server CPU performs the history information updating process, the process proceeds to step S220.

(Step S220)

In step S220, the administrative server CPU performs a process of deleting each of the betting information (step S211) and the win/lose information (step S215) that are temporarily stored in the card information memory area. In addition, at the same time, the administrative server CPU also performs a process of deleting the dividend information (step S216) temporarily stored in the dividend information memory area.

After the administrative server CPU performs the above-described process, the administrative server CPU ends the control process in the administrative server 120.

(Step S221)

In step S221, the administrative server CPU determines which of an exchange start command, a reading impossible command, and an exchange end command is received from the card adjustment device 100.

The exchange start command is the command that is transmitted from the card adjustment device 100 to the administrative server 120 in step S606 in a control process of the card adjustment device 100, when the game player 12 ends playing of the game and performs exchanging (conversion into cash), that is, when the employee or the like inserts the recording card M into the card adjustment device 100.

The reading impossible command is the command transmitted from the card adjustment device 100 to the administrative server 120 in step S612 of the control process in the card adjustment device 100, when the employee or the like inserts the recording card M into the card adjustment device 100, and the card adjustment device 100 cannot read the money information stored in the recording card M.

The exchange end command is the command transmitted from the card adjustment device 100 to the administrative server 120 in step S617 of the control process in the card adjustment device 100, when the employee or the like inputs predetermined information by operating an input means, such as a key board, after performing the exchange (conversion into cash) for the game player 12.

When the administrative server CPU determines that one of the above-described three commands transmitted from the card adjustment device 100 is received, the process proceeds to step S222, and when the administrative server CPU determines that one of the three commands transmitted from the card adjustment device 100 is not received, the administrative server CPU ends the control process in the administrative server 120.

(Step S222)

In step S222, the administrative server CPU performs the game end process. The game end process is described later in detail with reference to FIG. 7.

After the administrative server CPU performs the game end process, the administrative server CPU ends the control process in the administrative server 120.

(Game End Process)

Figure 9:
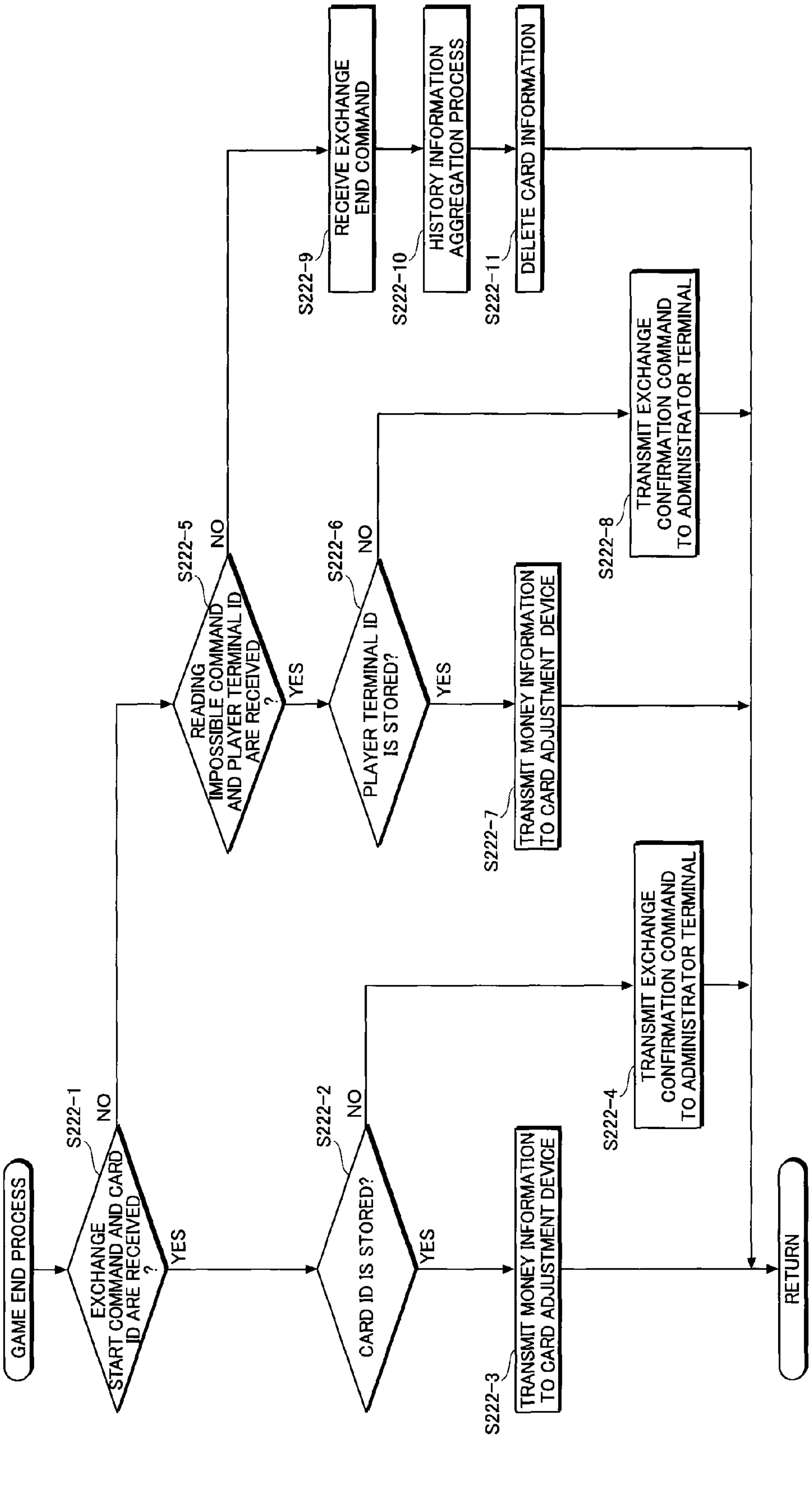
FIG. 9 is an exemplary flowchart showing a game end process in the administrative server.

Referring to FIG. 9, a description is given of an exemplary game control process in the administrative server 120.

(Step S222-1)

The administrative server CPU determines whether or not the exchange start command and the card ID are received. As described later, the card ID is transmitted together with the exchange start command from the card adjustment device 100 in step S606 in the control process in the card adjustment device 100 (step S606).

When the administrative server CPU determines that the exchange start command and the card ID are received, the process proceeds to step S222-2, and when the administrative server CPU determines that the exchange start command and the card ID are not received, the process proceeds to step S222-5.

(Step S222-2)

In step S222-2, the administrative server CPU determines whether or not the area "card ID" of the card information memory area includes a card ID that matches the card ID received in the process of step S222-1. The administrative server CPU determines that the area "card ID" does not store the card ID that matches the received card ID when, for example, the recording card M is forged.

When the administrative server CPU determines that the area "card ID" stores the card ID that matches the received card ID, the process proceeds to step S222-3, and when the administrative server CPU determines that the area "card ID" does not store the card ID that matches the received card ID, the process proceeds to step S222-4.

(Step S222-3)

In step S222-3, the administrative server CPU performs a process of transmitting, to the card adjustment device 100, the money information stored in association with the card ID via the transmitting means, such as a known transmit port. It should be noted that transmitting means corresponds to "updated valuable information transmitting part" described in the claims.

As described later, when the card adjustment device 100 receives the money information, in the case where the received money information matches the money information stored in the inserted recording card M, the card adjustment device 100 displays, for example, "adjusted amount of money ***" on the display device 103 (step S615**).

After the administrative server CPU transmits the money information, the administrative server CPU ends the control process in the administrative server 120.

(Step S222-4)

In Step S222-4, the administrative server CPU performs a process of transmitting the exchange confirmation command to the administrator terminal 140. When this command is transmitted, a message as described above, that is, "Please confirm the card inserted into the card adjustment device" is displayed on the display device of the administrator terminal 140 (step S106).

After the administrative server CPU transmits the exchange confirmation command, the administrative server CPU ends the control process in the administrative server 120.

(Step S222-5)

In step S222-5, the administrative server CPU determines whether or not the reading impossible command and the player terminal ID are received. As described later, the player terminal ID is transmitted together with the exchange start command from the card adjustment device 100 in step S612 in the control process in the card adjustment device 100.

When the administrative server CPU determines that the reading impossible command and the player terminal ID are received, the process proceeds to step S222-6, and when the administrative server CPU determines that the reading impossible command and the player terminal ID are not received, the process proceeds to step S222-9.

(Step S222-6)

In step S222-6, the administrative server CPU determines whether or not the area "player terminal ID" of the card information memory area stores a player terminal ID that matches the player terminal ID received in the process of step S222-5. The administrative server CPU determines that the area "player terminal ID" does not store the player terminal ID that matches the received player terminal ID when, for example, the recording card M is forged.

When the administrative server CPU determines that the area "player terminal ID" stores the player terminal ID that matches the received player terminal ID, the process proceeds to step S222-7, and when the administrative server CPU determines that the area "player terminal ID" does not store the player terminal ID that matches the received player terminal ID, the process proceeds to step S222-8.

(Step S222-7)

In step S222-7, as in the process of step S222-3, the administrative server CPU performs a process of transmitting the money information stored in association with the player terminal ID to the card adjustment device 100 via the transmitting means, such as a known transmit port. It should be noted that transmitting means corresponds to "updated valuable information transmitting part" described in the claims.

After the administrative server CPU transmits the money information, the administrative server CPU ends the control process in the administrative server 120.

(Step S222-8)

In step S222-8, as in the process of step S222-4, the administrative server CPU performs a process of transmitting the exchange confirmation command to the administrator terminal 140.

After the administrative server CPU transmits the exchange confirmation command, the administrative server CPU ends the control process in the administrative server 120.

(Step S222-9)

In step S222-9, the administrative server CPU performs a process of transmitting the exchange end command to the administrator terminal 140.

After the administrative server CPU transmits the exchange confirmation command, the administrative server CPU ends the control process in the administrative server 120.

(Step S222-10)

In step S222-10, the administrative server CPU performs a process of saving, as the history information, the game results from the start until the end of the table game played by the game player 12 (history information aggregation process). Specifically, the administrative server CPU performs a process of storing, among the history information stored in the history information memory area, the history information associated with the corresponding card ID or player terminal ID as the final game history. In this manner, it is possible to provide the history information to the game player 12 as the score, and use the history information when offering services in accordance with the betting information of the game player 12.

After the administrative server CPU performs the history information aggregation process, the administrative server CPU ends the control process in the administrative server 120.

(Step S222-11)

In step S222-11, the administrative server CPU performs a process of deleting, from the card information memory area, the card information associated with the card ID or player terminal ID for which the above-described history information aggregation process (step S222-10) is performed.

After the administrative server CPU performs the process of deleting the card information, the administrative server CPU ends the control process in the administrative server 120.

(Dealer Terminal Control)

Figure 10:
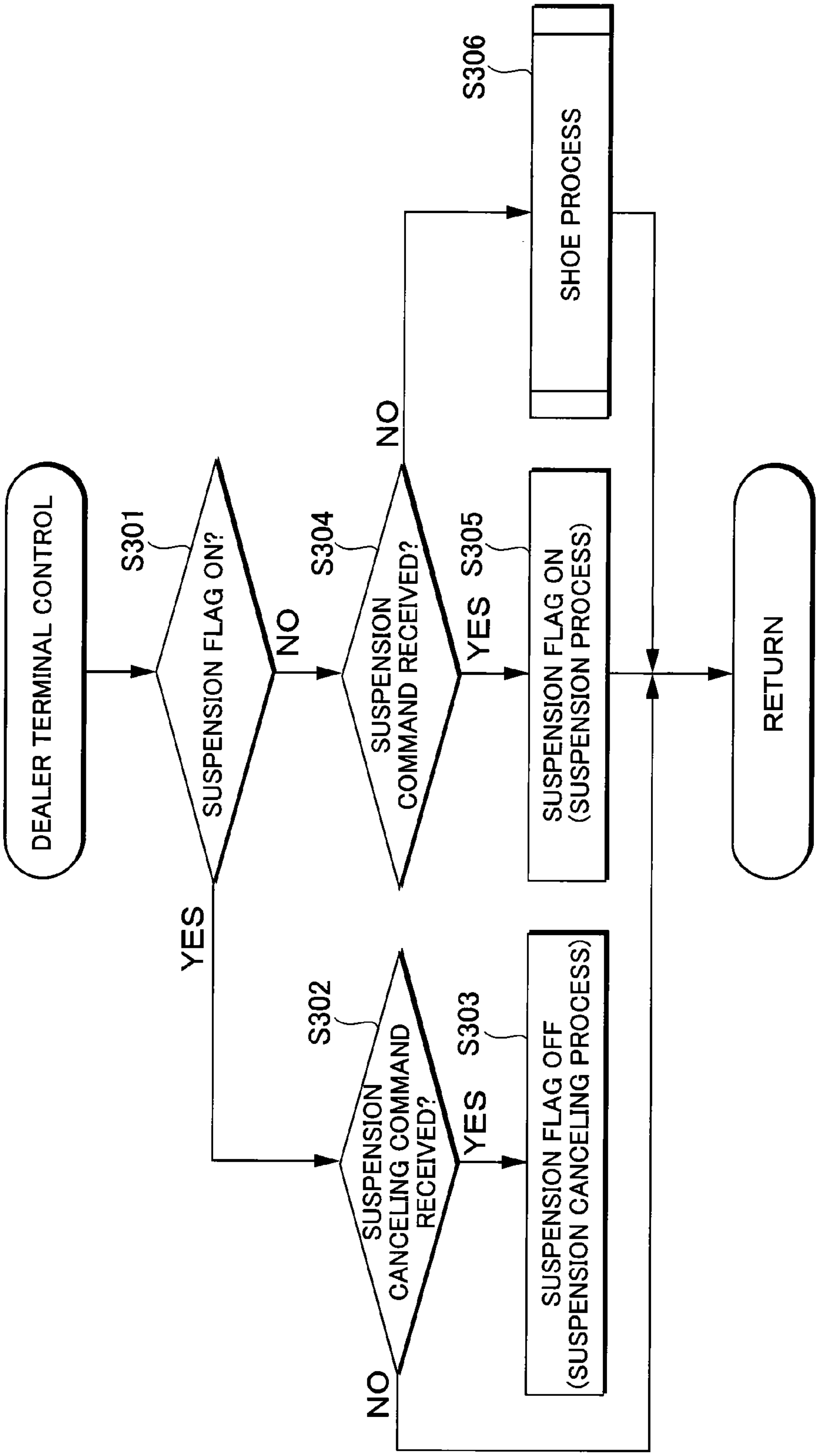
FIG. 10 is an exemplary flowchart showing a control process in a dealer terminal.

Next, referring to FIG. 10, a description is given of an exemplary control process in the dealer terminal 130.

(Step S301)

First, in step S301, a CPU forming the dealer terminal 130 (hereinafter referred to as "the dealer terminal CPU") determines whether or not the interruption flag is set in a memory area (hereinafter referred to as "the dealer terminal memory area") of a RAM or the like of the dealer terminal 130. The interruption flag is set in step S305, which is described later, when the interruption command transmitted from the administrator terminal 140 is received. In this embodiment, while the interruption flag is set in the dealer terminal memory area, an operation of the dealer terminal 130 is disabled, that is, proceeding of the baccarat game is suspended.

When the dealer terminal CPU determines that the interruption flag is set, the process proceeds to step S302, and when the dealer terminal CPU determines that the interruption flag is not set, the process proceeds to step S304.

(Step S302)

In step S302, the dealer terminal CPU determines whether or not the interruption canceling command transmitted from the administrator terminal 140 is received. The interruption canceling command is transmitted in the process of step S112 in the control process in the administrator terminal 140.

When the dealer terminal CPU determines that the interruption canceling command is received, the process proceeds to step S303, and when the dealer terminal CPU determines that the interruption canceling command is not received, the dealer terminal CPU ends the control process in the dealer terminal 130.

(Step S303)

In step S303, the dealer terminal CPU performs a process of turning OFF the interruption flag that is set to the dealer terminal memory area (interruption canceling process). With this process, a message such as "You can play game" is displayed on the display device of the dealer terminal 130, and an operation of the dealer terminal 130 that has been disabled is enabled, that is, it becomes possible to resume the baccarat game that has been interrupted.

After the dealer terminal CPU performs the interruption canceling process, the dealer terminal CPU ends the control process in the dealer terminal 130.

(Step S304)

In step S304, the dealer terminal CPU determines whether or not the interruption command transmitted from the administrator terminal 140 is received. The interruption command is transmitted in step S109 in the control process in the administrator terminal 140.

When the dealer terminal CPU determines that the interruption command is received, the process proceeds to step S305, and when the dealer terminal CPU determines that the interruption command is not received, the process proceeds to step S306.

(Step S305)

In step S305, the dealer terminal CPU performs a process of setting the interruption command in the dealer terminal memory area (interruption process). With this process, a message such as "Please wait" is displayed on the display device of the dealer terminal 130, and an operation of the dealer terminal 130 that has been enabled is disabled, that is, the proceeding of the baccarat game is suspended until the interruption flag is turned OFF in step S303.

After the dealer terminal CPU performs the interruption process, the dealer terminal CPU ends the control process in the dealer terminal 130.

(Step S306)

In step S306, the dealer terminal CPU performs a shoe process. The shoe process is described later in detail with reference to FIG. 11.

After the dealer terminal CPU performs the shoe process, the dealer terminal CPU ends the control process in the dealer terminal 130.

(Shoe Process)

Figure 11:
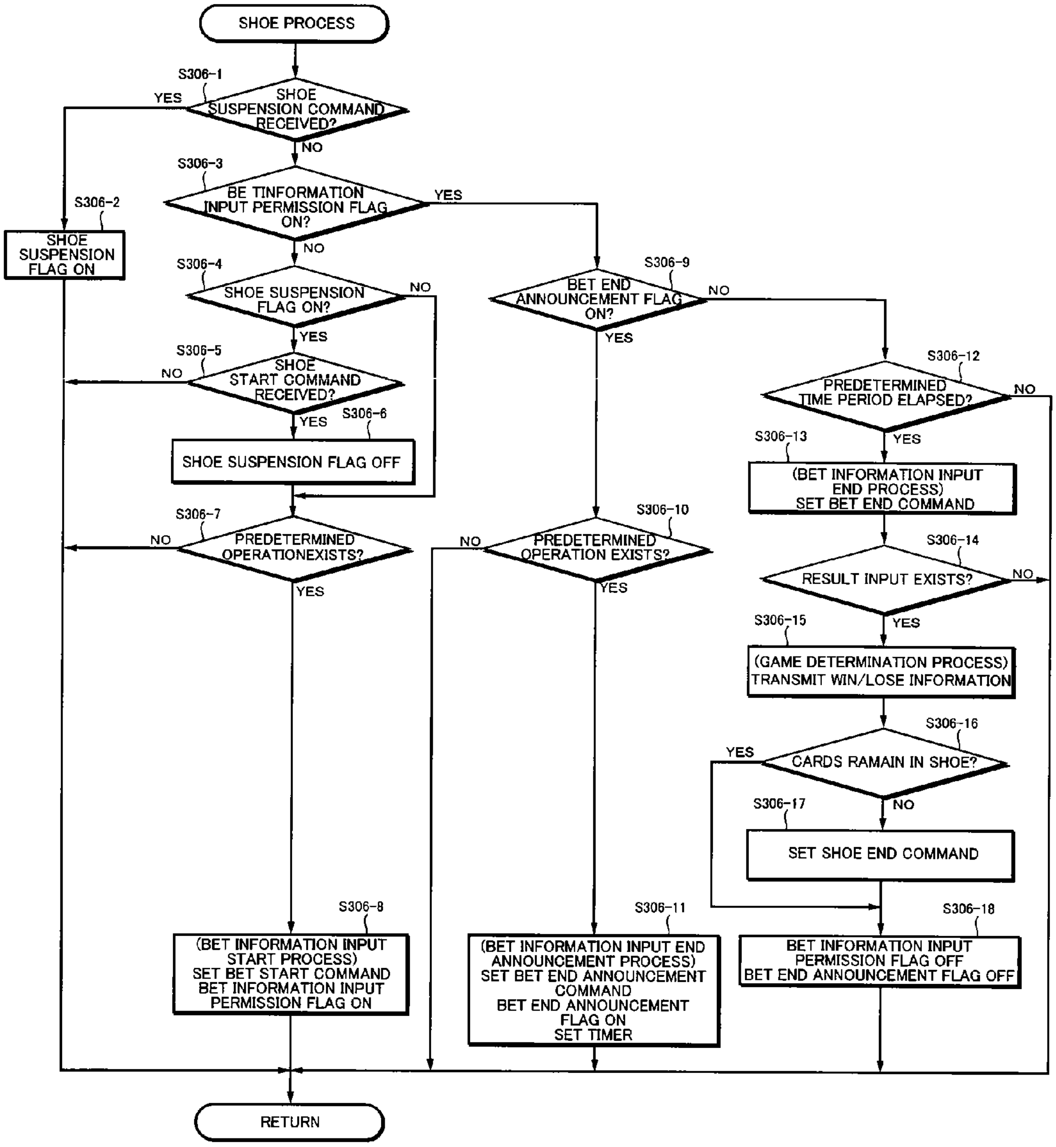
FIG. 11 is an exemplary flowchart showing an exemplary shoe process in the dealer terminal.

Next, referring to FIG. 11, a description is given of the shoe process in the dealer terminal 130.

(Step S306-1)

First, in step S306-1, the dealer terminal CPU determines whether or not the shoe suspension command transmitted from the administrator terminal 140 is received. The shoe suspension command is transmitted in the process of step S103 in the control process in the administrator terminal 140.

When the dealer terminal CPU determines that the shoe suspension command is received, the process proceeds to step S306-2, and when the dealer terminal CPU determines that the shoe suspension command is not received, the process proceeds to step S306-3.

(Step S306-2)

In step S306-2, the dealer terminal CPU performs a process of setting the shoe suspension flag in the dealer terminal memory area. In a state where the shoe suspension flag is set, an operation of the dealer terminal 130 is disabled, that is, the proceeding of the baccarat game is suspended. It should be noted that, once the shoe suspension flag is set, the state is maintained until the shoe suspension flag is turned OFF in step S306-6, which is described later, that is, until the shoe start command transmitted from the administrator terminal 140 is received.

After the dealer terminal CPU performs the process of setting the shoe suspension flag, the dealer terminal CPU ends the shoe process.

(Step S306-3)

In step S306-3, the dealer terminal CPU determines whether or not a betting information input permission flag is set in the dealer terminal memory area. The betting information input permission flag is set in the dealer terminal memory area in step S306-8, which is described later.

When the dealer terminal CPU determines that the betting information input permission flag is not set, the process proceeds to step S306-4, and when the dealer terminal CPU determines that the betting information input permission flag is set, the process proceeds to step S306-9.

(Step S306-4)

In step S306-4, the dealer terminal CPU determines whether or not the shoe suspension flag is set in the dealer terminal memory area. The shoe suspension flag is set in the dealer terminal memory area in the process of step S306-2.

When the dealer terminal CPU determines that the shoe suspension flag is set, the process proceeds to step S306-5, and when the dealer terminal CPU determines that the shoe suspension flag is not set, the process proceeds to step S306-7.

(Step S306-5)

In step S206-5, the dealer terminal CPU determines whether or not the shoe start command transmitted from the administrator terminal 140 is received. The shoe start command is transmitted in the process of step S104 in the control process of the administrator terminal 140.

When the dealer terminal CPU determines that the shoe start command is received, the process proceeds to step S306-6, and when the dealer terminal CPU determines that the shoe start command is not received, the dealer terminal CPU ends the shoe process.

(Step S306-6)

In step S306-6, the dealer terminal CPU performs a process of turning OFF the shoe suspension flag that is set in the dealer terminal memory area. With this process, a message such as "You can play game" is displayed on the display device of the dealer terminal 130, and it becomes possible for the dealer 11 to shuffle six or eight pairs of playing cards well and set them to shoe 61.

After the dealer terminal CPU performs the process of turning OFF the shoe suspension flag, the process proceeds to step S306-7.

(Step S306-7)

In step S306-7, the dealer terminal CPU determines whether or not the dealer 11 inputs predetermined information by operating a keyboard or the like of the dealer terminal 130. Such an operation is performed at the timing when, in a case where all of the cards C in the shoe 61 are pulled out ("YES" in the process of step S306-4), the dealer 11 sets the cards C to the shoe 61, it becomes possible to play the baccarat game with the new cards C, and at the timing when, in a case where the baccarat game is continued in a state where the cards C remain in the shoe 61 ("NO" in the process of step S306-4), it becomes possible to play the baccarat game by using the cards C that are already set in the shoe 61.

When the dealer terminal 130 determines that the dealer 11 inputs the predetermined information, the process proceeds to step S306-8, and when the dealer terminal 130 determines that the dealer 11 does not input the predetermined information, the dealer terminal 130 ends the shoe process.

(Step S306-8)

In step S306-8, the dealer terminal CPU performs a process of transmitting a betting start command to the player terminals 30, and setting the betting information input permission flag to the dealer terminal memory area (betting information input start process).

With the betting information input start process, a message such as "Accepting bets" is displayed on the respective display devices of the dealer terminal 130 and the player terminals 30, and it becomes possible for the game players 12 to input the betting information from the player terminals 30. It should be noted that, in this embodiment, as described above, the betting information that is input by the game players 12 and the win/lose information that is input by the dealer 11 in step S306-15, which is described later, are transmitted to the administrative server 120.

After the dealer terminal CPU performs the betting information input start process, the dealer terminal CPU ends the shoe process.

(Step S306-9)

In step S306-9, the dealer terminal CPU determines whether or not abetting end announcement flag is set in the dealer terminal memory area. The betting end announcement flag is set in the dealer terminal memory area in step S306-11, which is described later.

When the dealer terminal CPU determines that the betting end announcement flag is set, the process proceeds to step S306-10, and when the dealer terminal CPU determines that the betting end announcement flag is not set, the process proceeds to step S306-12.

(Step S306-10)

In step S306-10, the dealer terminal CPU determines whether or not the dealer 11 inputs predetermined information by operating the keyboard or the like of the dealer terminal 130. Such an operation is performed at the timing when, for example, the dealer 11 observes the status of the bets by the game players 12, and determines that inputting of the betting information by the game players 12 is almost done.

When the dealer terminal CPU determines that the predetermined information is input, the process proceeds to step S306-11, and when the dealer terminal CPU determines that the predetermined information is not input, the dealer terminal CPU ends the shoe process.

(Step S306-11)

In step S306-11, the dealer terminal CPU performs a process of transmitting a betting end announcement command to the player terminals 30, and setting a betting end announcement flag in the dealer terminal memory area. Additionally, at the same timing of this process, the dealer terminal CPU performs a process of starting timing using a timer, which is provided in the dealer terminal 130 (betting information input end announcement process).

With the betting information input end announcement process, a countdown display such as "00 seconds until bet is closed" is displayed according to the timing using the timer on the respective display devices of the dealer terminal 130 and the player terminals 30.

After the dealer terminal CPU performs the betting information input end announcement process, the dealer terminal CPU ends the shoe process.

(Step S306-12)

In step S306-12, the dealer terminal CPU determines whether or not the time measured by the timer that is set by the process in step S306-11 has elapsed a predetermined time period (for example, 10 seconds).

When the dealer terminal CPU determines that the predetermined time period has elapsed, the process proceeds to step S306-13, and when the dealer terminal CPU determines that the predetermined time period has not elapsed, the shoe process ends.

(Step S306-13)

In step S306-13, the dealer terminal CPU performs a process of transmitting the betting end announcement command to the player terminals 30 (betting information input end process).

By the betting information input end process, a message of "bet reception end" is displayed on the respective display devices of the dealer terminal 130 and the player terminals 30, and the game players 12 cannot input the betting information in the ongoing baccarat game. After this process, the dealer 11 picks cards from the shoe 61, deals cards to the Banker and the Player, and opens the cards so as to determine the result of the game.

After the dealer terminal CPU performs the betting information input end process, the process proceeds to step S306-14.

(Step S306-14)

In step S306-14, the dealer terminal CPU determines whether or not the win/lose information is input by operating the keyboard or the like of the dealer terminal 130. The win/lose information includes the card faces of the Banker hand and the Player hand, and the result of the game, that is, Banker win, Player win or Tie, and the like.

When the dealer terminal CPU determines that the win/lose information is input, the process proceeds to step S306-15, and when the dealer terminal CPU determines that the win/lose information is not input, the dealer terminal CPU ends the shoe process.

(Step S306-15)

In step S306-15, the dealer terminal CPU performs a process of transmitting the win/lose information to the administrative server 120 (game determination process).

Based on the betting information that is input by the game player 12 and the win/lose information that is input by the dealer 11, the administrative server 120 calculates dividend for each of the player terminals. The calculated dividend information is transmitted to the corresponding player terminal 30 (the player terminal 30 of the game player who has correctly predicted the result).

The win/lose information (indication that the prediction of the result was correct) and the dividend information, which are transmitted from the administrative server 120, are displayed on the display device of the player terminal 30 of the game player 12 who has correctly predicted the result. On the other hand, based on the win/lose information, which is transmitted from the administrative server 120, an indication that the prediction of the result was incorrect is displayed on the player terminal 30 of the game player who has incorrectly predicted the result.

After the dealer terminal CPU performs the above-described process, the process proceeds to step S306-16.

(Step S306-16)

In Step S306-16, the dealer terminal CPU determines whether or not the cards C remain in the shoe 61. In this embodiment, the dealer terminal CPU determines whether or not information related to whether or not there are cards C is input by the dealer 11 by operating the keyboard or the like of the dealer terminal 130.

When the dealer terminal CPU determines that no card remains in the shoe 61, the process proceeds to step S306-17, and when the dealer terminal CPU determines that the cards C remain in the shoe 61, the process proceeds to step S306-18.

(Step S306-17)

In Step S306-17, the dealer terminal CPU performs a process of transmitting a shoe end command to the administrator terminal 140.

After the dealer terminal CPU performs the above-described process, the process proceeds to step S306-18.

(Step S306-18)

In Step S306-18, the dealer terminal CPU performs a process of turning OFF each of the betting information input permission flag and the betting end announcement flag which are set in the dealer terminal memory area.

After the dealer terminal CPU performs the above-described process, the dealer terminal CPU ends the shoe process.

(Player Terminal Control)

Figure 12:
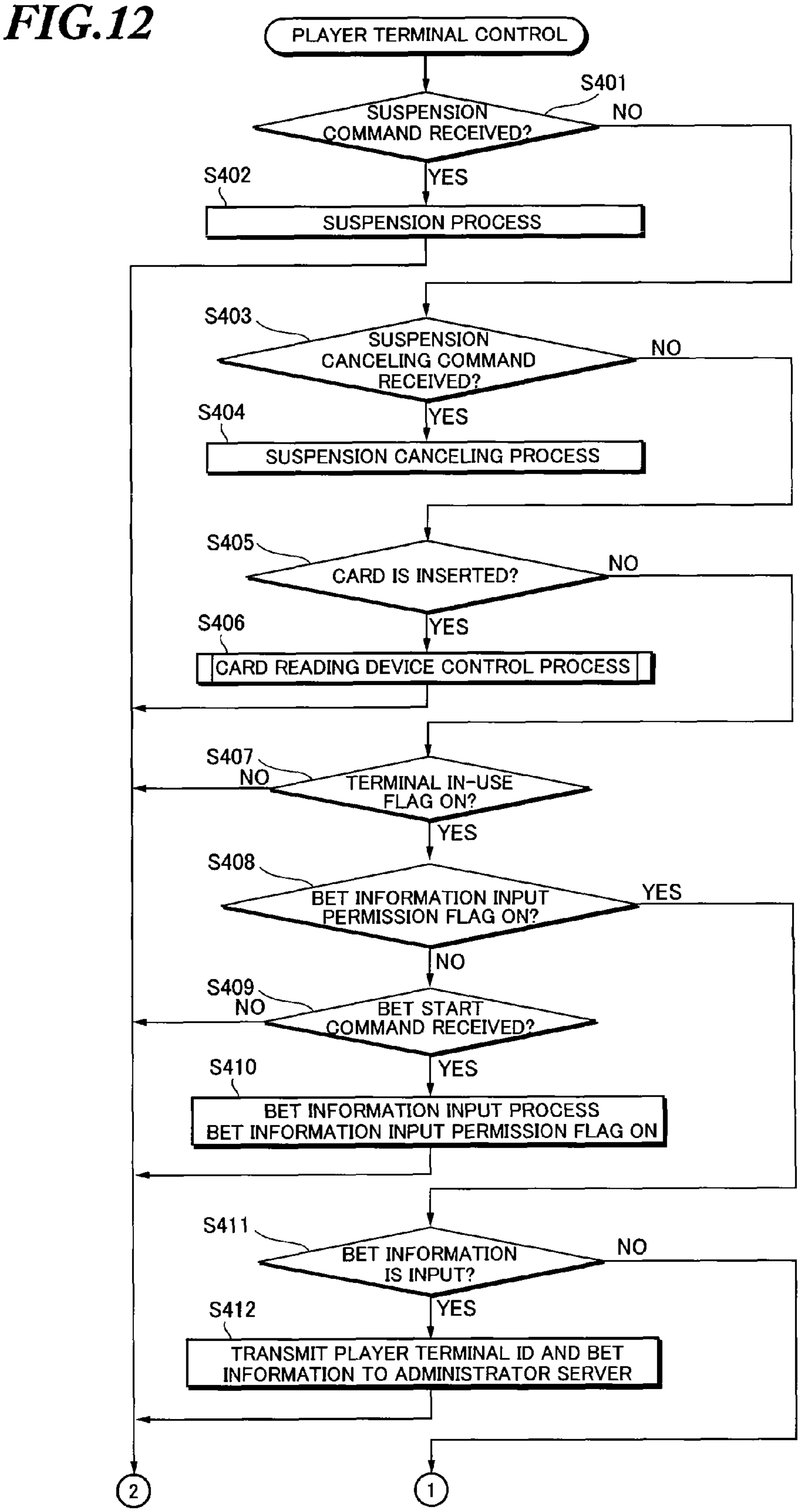
FIG. 12 is an exemplary flowchart showing an exemplary control process in the player terminal.
Figure 13:
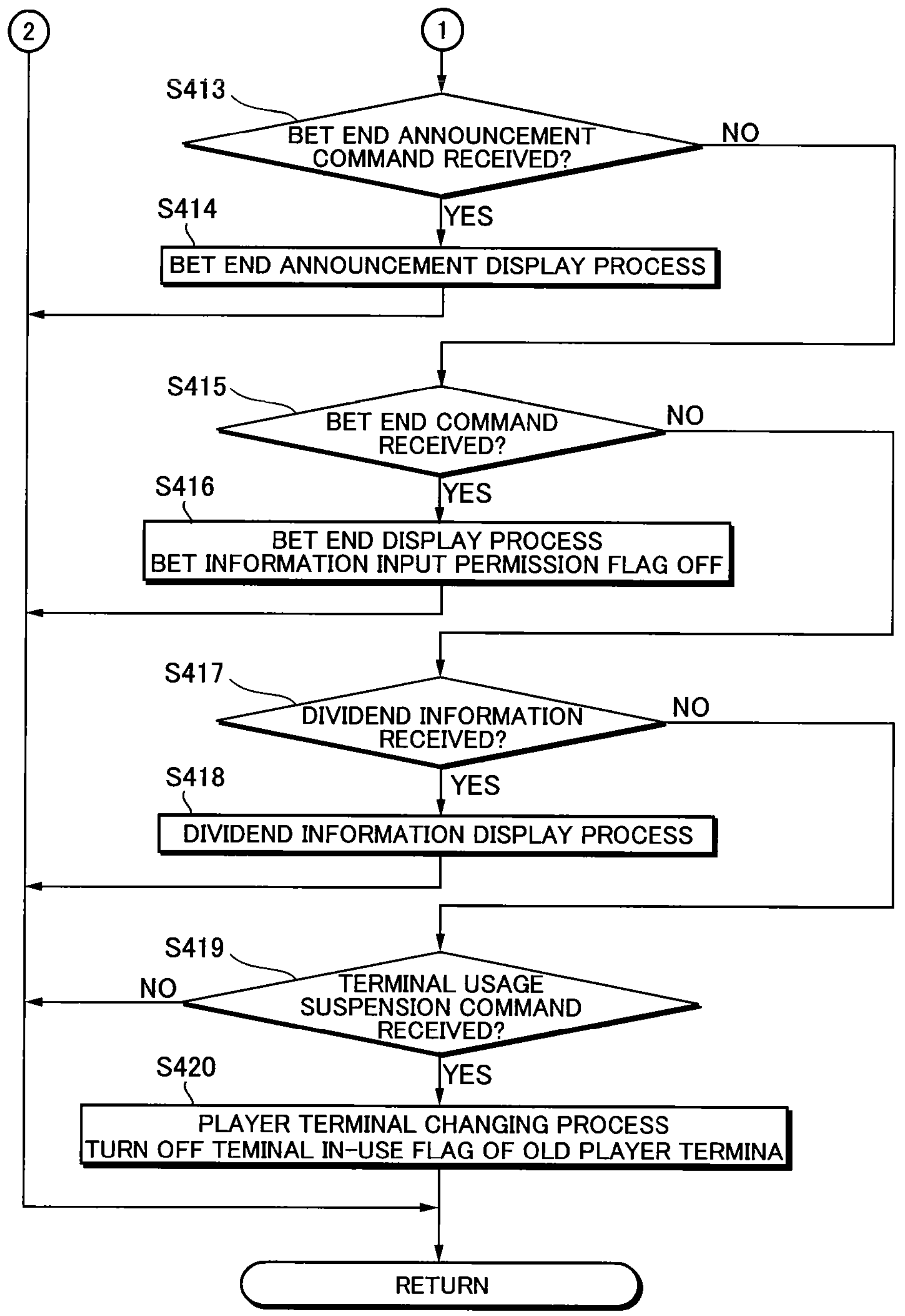
FIG. 13 is an exemplary flowchart following the flowchart shown in FIG. 12.

Next, referring to FIG. 12 and FIG. 13, a description is given of an exemplary control process in the player terminal 30.

(Step S401)

First, in step S401, the CPU forming the player terminal 30 (hereinafter referred to as "the player terminal CPU") determines whether or not the received command is the interruption command transmitted from the administrator terminal 140. The interruption command is the command transmitted in step S109 in the control process in the administrator terminal 140.

When the player terminal CPU determines that the received command is the interruption command, the process proceeds to step S402, and when the player terminal CPU determines that the received command is not the interruption command, the process proceeds to step S403.

(Step S402)

In step S402, the player terminal CPU performs the interruption process. In the interruption process, a process is performed that displays, on the betting screen display region 33 of the player terminal 30, a message such as "Please wait for a moment", and while the message is displayed, disables the input operation of the betting information, even when, for example, the game player 12 touches the betting screen display region 33 with a finger or the like.

After the player terminal CPU performs the interruption process, the player terminal CPU ends the control process in the player terminal 30.

(Step S403)

In step S403, the player terminal CPU determines whether or not the received command is the interruption canceling command transmitted from the administrator terminal 140. The interruption canceling command is the command transmitted in step S112 in the control process in the administrator terminal 140.

When the player terminal CPU determines that the received command is the interruption canceling command, the process proceeds to step S404, and when the player terminal CPU determines that the received command is not the interruption canceling command, the process proceeds to step S405.

(Step S404)

In step S404, the player terminal CPU performs the interruption canceling process. In the interruption canceling process, a process is performed that resumes the proceeding of the baccarat game that has been interrupted by the process in step S402. Specifically, a process is performed that displays, on the betting screen display region 33 of the player terminal 30, a message such as "You can play game", and enables the input of the betting information and the like, which has been disabled until then.

After the player terminal CPU performs the interruption process, the player terminal CPU ends the control process in the player terminal 30.

(Step S405)

In step S405, the player terminal CPU determines whether or not the recording card M is inserted into the card reading device 35 of the player terminal 30.

When the player terminal CPU determines that the recording card M is inserted, the process proceeds to step S406, and when the player terminal CPU determines that the recording card M is not inserted, the process proceeds to step S407.

(Step S406)

In step S406, the player terminal CPU performs the card reading device control process. The card reading device control process is described later with reference to FIG. 14.

After the player terminal CPU performs the card reading device control process, the player terminal CPU ends the control process in the player terminal 30.

(Step S407)

In step S407, the player terminal CPU determines whether or not a terminal in-use flag is set to the memory area (hereinafter referred to as "the player terminal memory area") such as a RAM forming the player terminal 30. The terminal in-use flag is set in step S406-3 or in step S406-10 in the card reading device control process, which is described later.

When the player terminal CPU determines that the terminal in-use flag is set in the player terminal memory area, the process proceeds to step S408, and when the player terminal CPU determines that terminal in-use flag is not set in the player terminal memory area, the player terminal CPU ends the control process in the dealer terminal 130.

(Step S408)

In step S408, the player terminal CPU determines whether or not the betting information input permission flag is set in the player terminal memory area. The betting information input permission flag is set in the player terminal memory area in the process of step S410, which is described later.

When the player terminal CPU determines that the betting information input permission flag is set in the player terminal memory area, the process proceeds to step S409, and when the player terminal CPU determines that the betting information input permission flag is not set in the player terminal memory area, the process proceeds to step S411.

(Step S409)

In step S409, the player terminal CPU determines whether or not the betting (BET) start command transmitted from the dealer terminal 130 is received. The betting start command is the command transmitted in step S306-8 of the shoe process by the dealer terminal 130.

When the player terminal determines that the betting start command is received, the process proceeds to step S410, and when the betting start command is not received, the player terminal CPU ends the control process in the player terminal 30.

(Step S410)

In step S410, the player terminal CPU performs a betting (BET) information input process, and sets the betting information input permission flag in the player terminal memory area. In the betting information input process, a process is performed that displays, on the betting screen display region 33 of the player terminal 30, a message for prompting the game player 12 to input the betting information, such as "Please place a BET". After the message is displayed, the game player 12 can input the betting information by touching the betting screen display region 33 with a finger or the like, until the message "bet reception end" is displayed on the display device in a betting end process in step S416, which is described later.

After the player terminal CPU performs the betting information input process and the setting of the betting information input permission flag, the player terminal CPU ends the control process in player terminal 30.

In step S411, the player terminal CPU determines whether or not the betting information is input by the game player 12 by touching the betting screen display region 33 with a finger or the like.

When the player terminal CPU determines that the betting information is input, the process proceeds to step S412, and when the player terminal CPU determines that the betting information is not input, the process proceeds to step S413.

(Step S412)

In step S412, the player terminal CPU performs a process of transmitting, to the administrative server 120, the betting information that is input in the process of step S411 together with the player terminal ID of the player terminal 30 from which the betting information is input.

As described later, in this embodiment, the money information of the recording card M inserted into the card reading device 35 is collectively managed by the administrative server 120, and the content of the money information cannot be recognized by the card reading device 35.

That is, in the case where the betting information that is input by the game player 12 exceeds the upper limit of the money information, it is impossible for the card reading device 35 to determine whether or not the input betting information exceeds the upper limit of the money information.

Hence, for example, in the case where the input betting information exceeds the range of the money information, in this embodiment, a signal indicating that the amount of money is insufficient is transmitted from the administrative server 120 to the player terminal 30, and a message such as "Amount of money is insufficient" is displayed on the display device of the player terminal 30 that received the above-described signal.

After the player terminal CPU performs the process of transmitting the player terminal ID and the betting information, the player terminal CPU ends the control process in the player terminal 30.

(Step S413)

In step S413, the player terminal CPU determines whether or not the betting end announcement command transmitted from the dealer terminal dealer terminal 130 is received. The betting end announcement command is the command transmitted in step S306-11 in the shoe process in the dealer terminal 130.

When the player terminal CPU determines that the betting end announcement command is received, the process proceeds to step S414, and when the player terminal CPU determines that the betting end announcement command is not received, the process proceeds to step S415.

(Step S414)

In step S414, the player terminal CPU performs a betting end announcement display process. In the betting end announcement display process, a process is performed that displays, on the betting screen display region 33 of the player terminal 30, a remaining time until betting is closed, such as "00 seconds until betting is closed", in a count-down manner.

After the player terminal CPU performs the betting end announcement display process, the player terminal CPU ends the control process in the player terminals 30.

(Step S415)

In step S415, the player terminal CPU determines whether or not the betting end command transmitted from the dealer terminal 130 is received. The betting end command is the command transmitted in step S306-13 in the shoe process in the dealer terminal 130.

When the player terminal CPU determines that the betting end command is received, the process proceeds to step S416, and when the player terminal CPU determines that the betting end command is not received, the process proceeds to step S417.

(Step S416)

In step S416, the player terminal CPU performs a betting end display process, and sets OFF the betting information input permission flag that is set in the player terminal memory area. In the betting end display process, a process is performed that displays, on the betting screen display region 33 of the player terminal 30, a message indicating that betting is closed, such as "Betting is closed, and disables the input of the betting information even when the game player 12 touches the betting screen display region 33 with a finger or the like.

After the player terminal CPU performs the betting end display process and sets OFF the betting information input permission flag, the player terminal CPU ends the control process in the player terminals 30.

(Step S417)

In step S417, the player terminal CPU determines whether or not the dividend information transmitted from the administrative server 120 is received. The dividend information is transmitted in step S217 of the control process in the administrative server 120.

When the player terminal CPU determines that the dividend information is received, the process proceeds to step S418, and when the player terminal CPU determines that the dividend information is not received, the process proceeds to step S419.

(Step S418)

In step S418, the player terminal CPU performs a dividend information display process. As described above, in the dividend information display process, for example, a process is performed that displays, on the display device of the player terminal 30 of the game player 12 who has correctly predicted the result, the dividend information and the indication that the prediction is correct, and displays, on the display device of the player terminal 30 of the game player 12 who has incorrectly predicted the result, the indication that the prediction is incorrect.

After the player terminal CPU performs the dividend information display process, the player terminal CPU ends the control process in the player terminal 30.

(Step S419)

In step S419, the player terminal CPU determines whether or not the terminal usage suspension command transmitted from the administrative server 120 is received. The terminal usage suspension command is the command transmitted in the process of step S211 in the control process in the administrative server 120, when the game player 12 starts playing the game by using a different player terminal 30 instead of the player terminal 30 (hereinafter referred to as "the old player terminal 30") that the game player 12 has been using.

When the player terminal CPU determines that the terminal usage suspension command is received, the process proceeds to step S420, and when the player terminal CPU determines that the terminal usage suspension command is not received, the player terminal CPU ends the control process in the player terminal 30.

(Step S420)

In step S420, the player terminal CPU of the old player terminal 30 performs a process of turning OFF the terminal in-use flag that is stored in the player terminal memory area.

After the player terminal CPU performs the process of turning OFF the terminal in-use flag, the player terminal CPU ends the control process in the player terminal 30.

(Card Reading Device Control Process)

Figure 14:
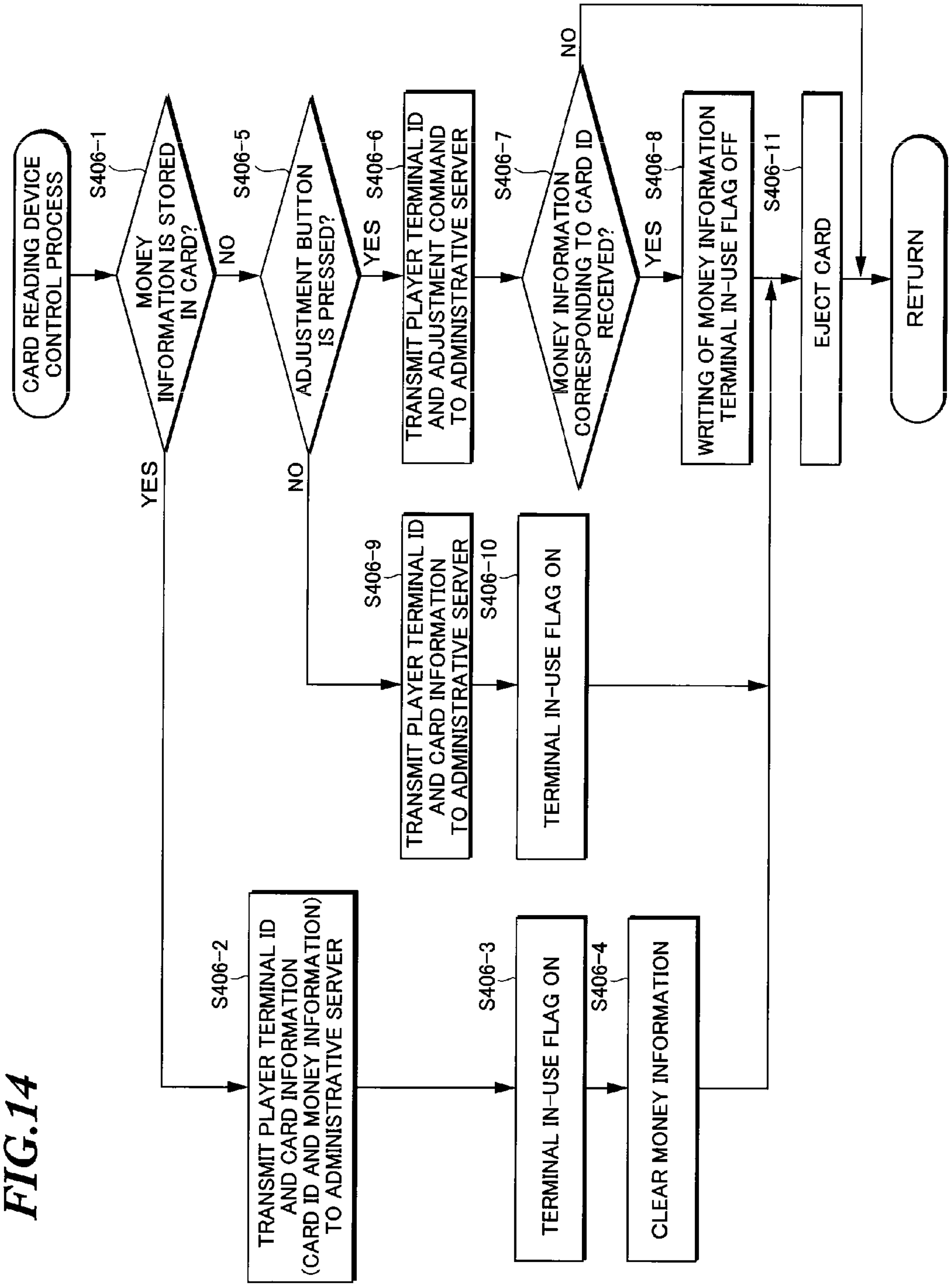
FIG. 14 is an exemplary flowchart showing a card reading device control process in the player terminal.

Next, referring to FIG. 14, a description is given of an exemplary card reading device control process.

(Step S406-1)

First, in step S406-1, the player terminal CPU that determines that the recording card M is inserted into the card reading device 35 in the process of step S405 determines whether or not the money information is stored in the recording card M. As described above, in the state where the recording card M is issued by the card issuing device 90, two sets of information, that is, the card ID and the money information, is stored on the recording card M according to this embodiment. However, once the recording card M in which the money information is stored is inserted into the card issuing device 90, only the card ID is stored in the recording card M until the money information is written on the recording card M in the process of step S406-8, which is described later. Namely, in the process of step S406-1, it is determined whether or not the insertion of the recording card M into the card reading device 35 is the second time or more.

When the player terminal CPU determines that the money information is stored on the recording card M, that is, when the insertion of the recording card M into the card reading device 35 is the first time, the process proceeds to step S406-2. On the other hand, when the player terminal CPU determines that the money information is not stored on the recording card M, that is, when the insertion of the recording card M into the card reading device 35 is the second time or more, the process proceeds to step S406-5.

(Step S406-2)

In step S406-2, the player terminal CPU performs a process of transmitting, to the administrative server 120, the player terminal ID of the player terminal 30 having the card reading device 35 into which the recording card M is inserted, together with the card information (the card ID and the money information) of the inserted recording card M. As described above, the cases where the process of step S406-2 is performed include a case where the recording card M is inserted into the card reading device 35 for the first time after the purchase of the recording card M.

After the player terminal CPU performs the process of transmitting the above-described information, the player terminal CPU ends the card reading device control process.

(Step S406-3)

In step S406-3, the player terminal CPU performs a process of setting the terminal in-use flag in the player terminal memory area. By setting the terminal in-use flag, it becomes possible to perform the above-described processes from step S408 to step S420 in the control process in the player terminal 30, that is, to input the betting information and the like.

After the player terminal CPU sets the terminal in-use flag, the player terminal CPU ends the card reading device control process.

(Step S406-4)

In step S406-4, the player terminal CPU performs a process of deleting the money information stored on the recording card M. Hence, while the game player 12 is playing the game, only the card ID is stored in the recording card M.

After the player terminal CPU performs the process of deleting the money information, the process proceeds to step S406-11.

(Step S406-5)

In the process of step S406-5, when the player terminal CPU determines that the money information is not stored in the recording card M (when the player terminal CPU determines that the insertion of the recording card M into the card reading device 35 is the second time or more) in the process of step S406-1, the player terminal CPU determines whether or not the adjustment button 37 provided in the card reading device 35 is pressed.

When the player terminal CPU determines that the adjustment button 37 is pressed, the process proceeds to step S406-6, and when the player terminal CPU determines that the adjustment button 37 is not pressed, the process proceeds to step S406-9.

(Step S406-6)

In step S406-6, the player terminal CPU performs a process of transmitting, to the administrative server 120, the adjustment command together with the player terminal ID of the card reading device 35 (player terminal 30) to which the recording card M is inserted. As described above, the administrative server 120 that receives the adjustment command and the player terminal ID transmits the money information stored in association with the received player terminal ID to the corresponding player terminal 30 (step S213).

After the player terminal CPU transmits the player terminal ID and the adjustment command, the process proceeds to step S406-7.

(Step S406-7)

In step S406-7, the player terminal CPU determines whether or not the money information transmitted from the administrative server 120 is received. The money information is transmitted from the administrative server 120 in step S213 of the control process in the administrative server 120.

When the player terminal CPU determines that the money information is received, the process proceeds to step S406-8, and when the player terminal CPU determines that the money information is not received, the player terminal CPU ends the card reading device control process.

(Step S406-8)

In step S406-8, the player terminal CPU performs a process of recording the money information received in the process of step S406-7 on the recording card M that is inserted into the card reading device 35. Additionally, at the same time, the player terminal CPU performs a process of turning OFF the terminal in-use flag that is set in the player terminal memory area. By turning OFF the terminal in-use flag, it becomes impossible to perform the processes from step S408 to step S420 in the control process in the player terminal 30 (the input of the betting information and the like).

After the player terminal CPU performs the above-described process, the process proceeds to step S406-11.

(Step S406-9)

When the player terminal CPU determines that the adjustment button 37 is not pressed in the process of step S406-5, that is, when the player terminal CPU determines that the game player 12 does not wish to end playing of the table game, the player terminal CPU performs a process in step S406-9 of transmitting, to the administrative server 120, the card ID together with the player terminal ID of the player terminal 30 having the card reading device 35 to which the recording card M is inserted. As described above, the cases where the process of step S406-9 is performed include a case where, when playing the game by using the player terminal 30, the game is newly started by using another player terminal 30. For example, when using of the player terminal 30 installed in the area A1 is ended, and the recording card M is inserted into the card reading device 35 of the 30 that is installed in the area A2. Additionally, since the money information is not stored in the recording card M in the process of step S406-9, unlike the process in step S406-2, the money information is not transmitted to the administrative server 120.

After the player terminal CPU performs the above-described process, the process proceeds to step S406-10.

(Step S406-10)

In step S406-10, the player terminal CPU performs a process of setting the terminal in-use flag to the player terminal memory area as in step S406-3.

After the player terminal CPU sets the terminal in-use flag, the player terminal CPU ends the card reading device control process.

(Step S406-11)

The player terminal CPU performs a process of ejecting the recording card M that has been inserted into the card reading device 35.

After the player terminal CPU ejects the recording card M, the player terminal CPU ends the card reading device control process.

(Card Issuing Device Control Process)

Figure 15:
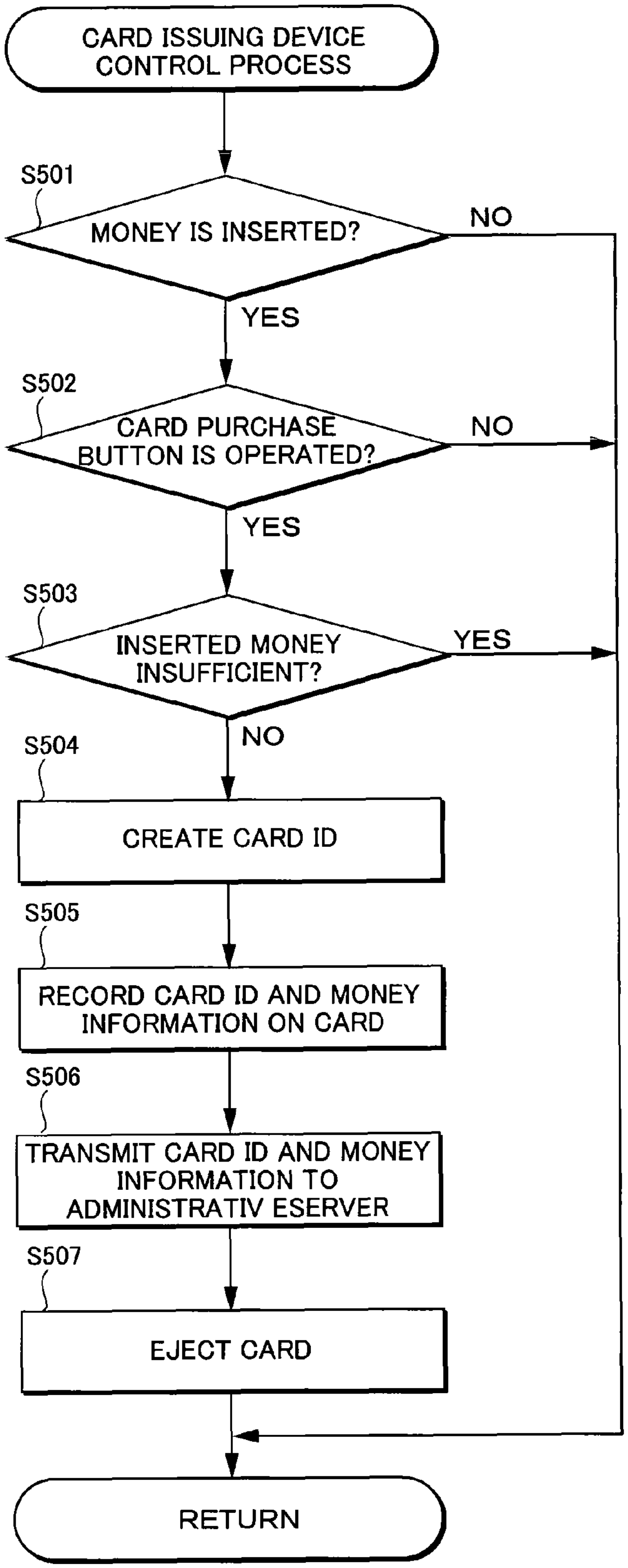
FIG. 15 is an exemplary flowchart showing a control process in the card issuing device.

Next, referring to FIG. 15, a description is given of an exemplary control process in the card issuing device 90.

(Step S501)

First, in step S501, a CPU (hereinafter referred to as "the card issuing device CPU") forming the card issuing device 90 determines whether or not the game player 12 inserts money, such as coins and bills, into the money insertion openings 91 of the card issuing device 90. It should be noted that, in the card issuing device 90, when the money is inserted, the card issuing device CPU determines whether or not the inserted money is forged. When the inserted money is forged, or when it is impossible to determine whether or not the inserted money is forged, the inserted money is returned from the money return opening 95. On the other hand, when the card issuing device CPU determines that the inserted money is not forged, the total amount of money is stored in a memory area (hereinafter referred to as "the card issuing device memory area") such as a RAM forming the card issuing device 90, and is displayed on the display device 92 of the card issuing device 90.

When the card issuing device CPU determines that the money is inserted, the process proceeds to step S502, and when the card issuing device CPU determines that the money is not inserted, the card issuing device CPU ends the card issuing device control process.

(Step S502)

In step S502, the card issuing device CPU determines whether or not any one of the plurality of the card issuing buttons 93 (the card issuing button 93*a* through the card issuing button 93*d*), each displaying a predetermined amount of money, is pressed.

When the card issuing device CPU determines that one of the card issuing buttons 93 is pressed, the process proceeds to step S503, and when the card issuing device CPU determines that none of the card issuing buttons 93 is pressed, the card issuing device CPU ends the card issuing device control process.

(Step S503)

The card issuing device CPU compares the total amount of money stored in the card issuing device memory area with the amount of money corresponding to one of the card issuing buttons 93 operated in step S502, and determines whether or not the amount of money is insufficient.

When the card issuing device CPU determines that the total amount of money is sufficient, the process proceeds to step S504, and when the card issuing device CPU determines that the total amount of money is insufficient, the card issuing device CPU ends the card issuing device control process.

(Step S504)

In step S504, the card issuing device CPU performs a process of creating the card ID for storing in the recording card M. The card ID is the identification information formed by a plurality of code numbers and/or the like, which is randomly created by the card issuing device CPU with the use of the predetermined algorithm, and is unique at least within the period of validity of the recording card M. Additionally, in this embodiment, since a recording medium such as a membership card for identifying the game player 12 is not used, the card ID serves as a medium to identify the game player 12.

After the card issuing device CPU creates the card ID, the process proceeds to step S505.

(Step S505)

In step S505, the card issuing device CPU performs a process of storing, in the recording card M, the money information of the amount of money corresponding to the one of the card issuing buttons 93 operated in the process of step S502, and the card ID created in the process of step S504. It is possible to perform such storing by, for example, writing the coded card ID and money information on a storage medium, such as a magnetic card, by a known card read/write device.

After the card issuing device CPU stores the card ID and the money information in the recording card M, the process proceeds to step S506.

(Step S506)

In step S506, the card issuing device CPU performs a process of transmitting, to the administrative server 120, the card information, such as the card ID and the money information, stored in the recording card M in the process of step S505.

After the card issuing device CPU performs the process of transmitting the card information to the administrative server 120, the process proceeds to step S507.

(Step S507)

In step S507, the card issuing device CPU performs a process of ejecting, from the card ejecting opening 94 of the card issuing device 90, the recording card M in which the card ID and the money information are stored.

After the card issuing device CPU ejects the recording card M, the card issuing device CPU ends the card issuing device control process.

It should be noted that the above-described process is an exemplary process for issuing the recording card M, and various modifications can be made to the above-described process. For example, it is possible to adopt a configuration that requires, after performing the process of step S502, an input of identification information, such as a password, which can be known only by the game player 12, and stores, in the recording card M, the identification information together with the money information and the card ID in step S505. With such a configuration, when adjusting the recording card M by the card adjustment device 100, it is impossible to adjust the recording card M unless the identification information is input. In such a case, for example, it is possible to prevent the adjustment of the recording card M by a person who does not know the identification information.

(Card Adjustment Device Control Process)

Figure 16:
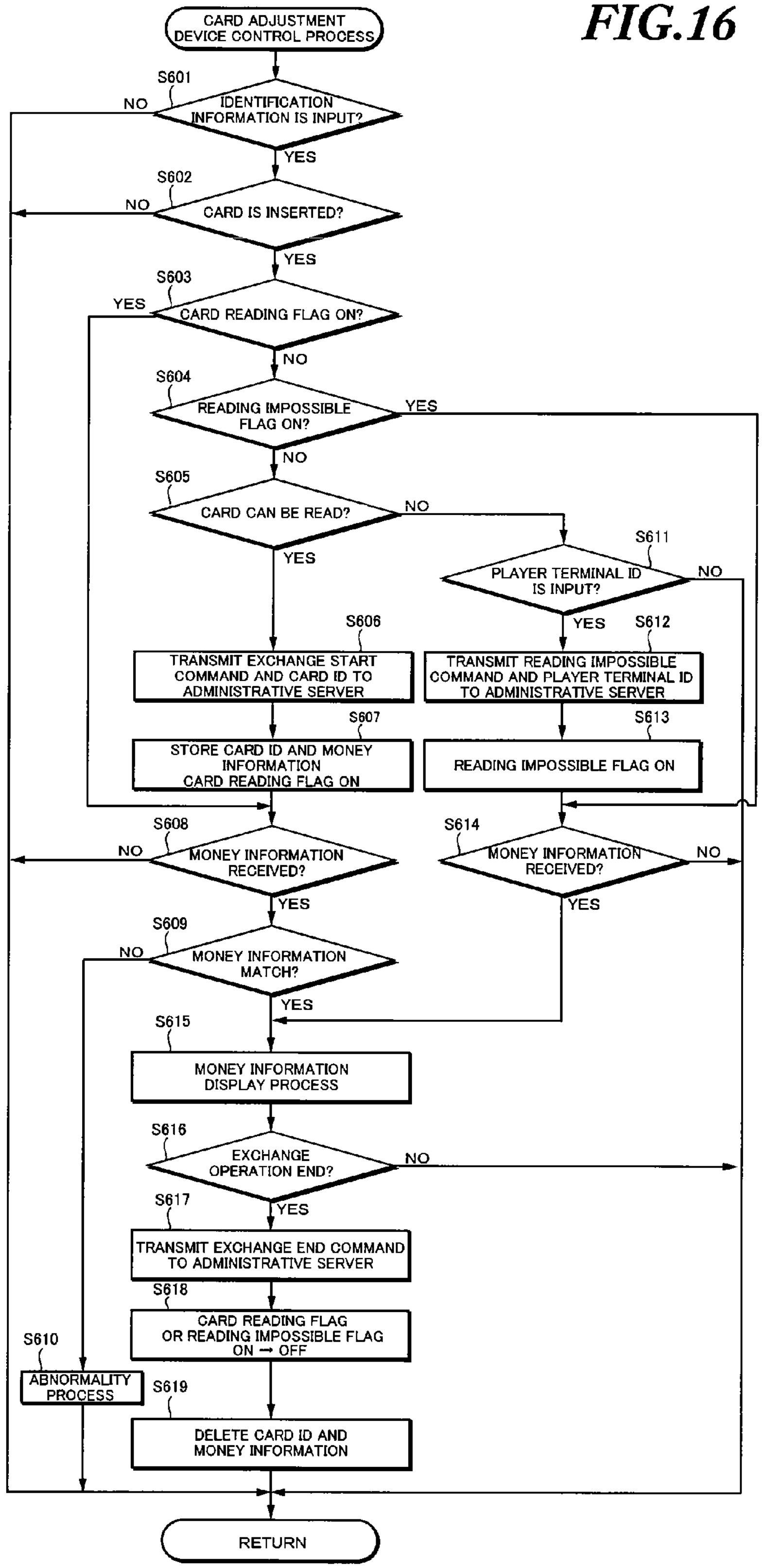
FIG. 16 is an exemplary flowchart showing a control process in the card adjustment device.

Next, referring to FIG. 16, a description is given of an exemplary control process in the card adjustment device 100.

(Step S601)

First, in step S601, a CPU (hereinafter referred to as "the card adjustment device CPU") forming the card adjustment device 100 determines whether or not there is an input of predetermined identification information (for example, a password) that can be known only by the employee or the like who operates the card adjustment device 100. It is possible to apply a configuration in which the identification information is to be input every time the recording card M is inserted. Additionally, it is also possible to apply a configuration in which the identification information is to be input when the recording card M is inserted for a predetermined number of times (for example, ten times). Further, the identification information may be another kind of information, such as a fingerprint or the like, in addition to the password.

When the card adjustment device CPU determines that the identification information is input, the process proceeds to step S602, and when the card adjustment device CPU determines that the identification information is not input, the card adjustment device CPU ends the control process in the card adjustment device 100.

(Step S602)

In step S602, the card adjustment device CPU determines whether or not the recording card M is inserted into the card insertion opening 102 of the card adjustment device 100.

When the card adjustment device CPU determines that the recording card M is inserted, the process proceeds to step S603, and when the card adjustment device CPU determines that the recording card M is not inserted, the card adjustment device CPU ends the control process in the card adjustment device 100.

(Step S603)

In step S603, the card adjustment device CPU determines whether or not a card reading flag is set to a memory area (hereinafter referred to as "the card adjustment device memory area") such as a RAM forming the card adjustment device 100. The card reading flag is set in the process of step S607, which is described later.

When the card adjustment device CPU determines that the card reading flag is not set in the card adjustment device memory area, the process proceeds to step S604, and when the card adjustment device CPU determines that the card reading flag is set in the card adjustment device memory area, the process proceeds to step S608.

Further, when the identification information that can be known only by the game player 12 is stored in the recording card M as described above, for example, a step may be added between the process of step S602 and the process of step S603, which step prompts the game player 12 to input the identification information.

(Step S604)

In step S604, the card adjustment device CPU determines whether or not a reading impossible flag is set in the card adjustment device memory area. The reading impossible flag is set in the process of step S614, which is describe later.

When the card adjustment device CPU determines that the reading impossible flag is not set in the card adjustment device memory area, the process proceeds to step S605, and when the card adjustment device CPU determines that the reading impossible flag is set in the card adjustment device memory area, the process proceeds to step S614.

(Step S605)

In step S605, the card adjustment device CPU determines whether or not the card information (the card ID and the money information) stored in the recording card M can be read by the card read/write device (not shown). The cases where the card information cannot be read include, for example: a case where the recording card M is deformed, damaged, or the like, and the recording card M cannot be set to a proper reading position; a case where the recording card M is forged; and a case where the card read/write device itself is broken.

When the card adjustment device CPU can read the card information stored in the recording card M, the process proceeds to step S606, and when the card adjustment device CPU cannot read the card information, the process proceeds to step S611.

(Step S606)

In step S606, the card adjustment device CPU performs a process of transmitting, to the administrative server 120, the card ID stored in the recording card M, together with the exchange start command (the command indicating that an operation related to exchanging of a gift or the like with the corresponding money information is started). In addition, as described above, when the administrative server 120 that receives the card ID determines that the corresponding card ID is not stored as a result of searching the card information memory area, the administrative server 120 transmits, to the administrator terminal 140, a command indicating that there is a possibility that the recording card M is forged (step S222-4).

After the card adjustment device CPU transmits the exchange start command and the card ID to the administrative server 120, the process proceeds to step S607.

(Step S607)

In step S607, the card adjustment device CPU performs a process of temporarily storing the card information (the card ID and the money information) stored on the recording card M in the card adjustment device memory area, and setting the card reading flag.

After the card adjustment device CPU performs the above-described process, the process proceeds to step S608.

(Step S608)

In step S608, the card adjustment device CPU determines whether or not the money information is received from the administrative server 120. The money information is transmitted to the card adjustment device 100 in the process of step S222-3 in the game end process in the administrative server 120.

When the card adjustment device CPU determines that the money information is received, the process proceeds to step S609, and when the card adjustment device CPU determines that the money information is not received, the card adjustment device CPU ends the control process in the card adjustment device 100.

(Step S609)

In the process of step S609, the card adjustment device CPU determines whether or not the money information temporarily stored in the card adjustment device memory area in the process of step S607 matches the money information received from the administrative server 120 in the process of step S608. The cases where these two kinds of information do not match include, for example, a case where the money information of the recording card M is falsified.

When the card adjustment device CPU determines that the above-described two kinds of information match, the process proceeds to step S615, and when the card adjustment device CPU determines that the two kinds of information do not match, the process proceeds to step S610.

(Step S610)

The card adjustment device CPU that determines in the process of step S609 that the two kinds of money information do not match performs an abnormality process in step S610. In the abnormality process, for example, processes are performed such as setting off sirens, displaying on the display device that an abnormality occurs, and transmitting an abnormality signal to the administrator terminal 140.

After the card adjustment device CPU performs the abnormality process, the card adjustment device CPU ends the control process in the card adjustment device 100.

(Step S611)

The card adjustment device CPU that determines that the recording card M cannot be read in the process of step S605 determines whether or not the player terminal ID is input. Specifically, the card adjustment device CPU determines that the player terminal is input, when the employee or the like operating the card adjustment device 100 asks the game player 12 of the player terminal 30 used for playing the table game, and inputs, to the identification information input device 101, the player terminal ID corresponding to the player terminal.

When the card adjustment device CPU determines that the player terminal ID is input, the process proceeds to step S612, and when the card adjustment device CPU determines that the player terminal ID is not input, the card adjustment device CPU ends the control process in the card adjustment device 100.

(Step S612)

In step S612, the card adjustment device CPU performs a process of transmitting, to the administrative server 120, the player terminal ID that is input in the process of step S611, together with the reading impossible command (the command indicating that the card information stored in the recording card M cannot be read by the card adjustment device 100). Additionally, as described above, when the administrative server 120 that receives the player terminal ID determines that the corresponding player terminal ID is not stored as a result of searching the card information memory area, the administrative server 120 transmits, to the administrator terminal 140, the command indicating that there is a possibility that the inserted recording card M is forged (step S222-8).

After the card adjustment device CPU transmits the reading impossible command and the player terminal ID to the administrative server 120, the process proceeds to step S613.

(Step S613)

In step S613, the card adjustment device CPU performs a process of setting the reading impossible flag to the card adjustment device memory area.

After the card adjustment device CPU performs the above-described process, the process proceeds to step S614.

(Step S614)

In step S614, the card adjustment device CPU determines whether or not the money information is received from the administrative server 120. The money information is transmitted to the card adjustment device 100 in the process of step S222-7 in the game end process in the administrative server 120.

When the card adjustment device CPU determines that the money information is received, the process proceeds to step S615, and when the card adjustment device CPU determines that the money information is not received, the card adjustment device CPU ends the control process in the card adjustment device 100.

(Step S615)

In step S615, the card adjustment device CPU performs a process of displaying, on the display device of the card adjustment device 100, the money information that serves as an index when offering a gift or the like to the game player 12 (money information display process). In this embodiment, the money information is displayed on the display device. However, this is not the limitation, and the money information can be printed on a paper medium, such as a receipt.

After the card adjustment device CPU performs the money information display process, the process proceeds to step S616.

(Step S616)

In step S616, the card adjustment device CPU determines whether or not the exchange operation ends based on the money information displayed in the process of step S617. Specifically, the card adjustment device CPU can determine that the offering of the gift or the like ends when predetermined information is input by the employee or the like by operating an input means such as a switch after performing the exchange operation.

When the card adjustment device CPU determines that the exchange operation ends, the process proceeds to step S617, and when the card adjustment device CPU determines that the exchange operation does not end, the card adjustment device CPU ends the control process in the card adjustment device 100.

(Step S617)

In step S617, the card adjustment device CPU performs a process of transmitting the exchange end command to the administrative server 120.

After the card adjustment device CPU transmits the exchange end command to the administrative server 120, the process proceeds to step S618.

(Step S618)

In step S618, the card adjustment device CPU performs a process of turning OFF the reading impossible flag or the card reading flag that is set to the card adjustment device memory area.

After the card adjustment device CPU performs the process of turning OFF one of the above-described flags, the process proceeds to step S619.

(Step S619)

In step S619, the card adjustment device CPU performs a process of deleting, when the card ID and the money information are stored in the card adjustment device memory area, these sets of information.

After the card adjustment device CPU performs deleting of the above-described information, the card adjustment device CPU ends the control process in the card adjustment device 100.

As described above, in this embodiment, when the game player 12 inserts the recording card M on which the money information is stored in to the card reading device 35 in order to start the baccarat game or another table game (for example, a roulette game), the money information is deleted from the recording card M by the card reading device 35, and thereafter the recording card M is automatically ejected from the card reading device 35. Additionally, when the recording card M on which the money information is not stored is inserted into the card reading device 35, and the game player 12 operates adjustment button 37, the money information received from the administrative server 120 is written on the recording card M, and thereafter the recording card M is automatically ejected from the card reading device 35.

As mentioned above, in either case, when the game player 12 inserts the recording card M into the card reading device 35, the recording card M is automatically ejected from the card reading device 35 after the money information is deleted or written. Hence, it is possible for the game player 12 to carry the recording card M while the game player 12 is playing the baccarat game or another table game as well as when ending the baccarat game or another table game. Therefore, for example, when the game player 12 playing the baccarat game by using the player terminal 30 installed in the area A1 wishes to play another table game by using the player terminal 30 installed in the area A2, it is possible for the game player 12 to play another table game by using the player terminal 30 installed in the area A2, without performing a cumbersome operation for ejecting a recording medium as in a conventional valuable information reading device.

Additionally, with the above-described configuration, the money information of the game player 12 who plays the baccarat game or another table game by using the player terminal 30 is transmitted to the administrative server 120 on a real-time basis. Hence, it is possible for the house to collectively manage the money information.

Further, when the game player 12 inserts the recording card M into the card reading device 35, and operates the adjustment button 37, the money information stored/updated in the administrative server 120 is transmitted to the card reading device 35, and this money information is written by the card reading device 35. Hence, it is possible for the game player 12 to obtain correct money information at the time when the game player 12 ends playing of the baccarat game or another table game. Accordingly, it is possible to avoid the situation in which the game player 12 suffers from a disadvantage since the game result is not reflected to the recording card M.

In addition, according to this embodiment, when the card adjustment device 100 can read the money information stored in the recording card M, the exchange operation is performed based on the updated valuable information that is read. On the other hand, in the case where the card adjustment device 100 cannot read the money information stored in the recording card M, when the employee or the like inputs, to the identification information input device 101, the player terminal ID of the player terminal 30 used by the game player 12, it is possible to obtain, from the administrative server 120, the money information stored in association with the player terminal ID. That is, in each of the above-described cases, with the card adjustment device 100, it is possible to reliably obtain the correct money information to which the game result is reflected and which the game player 12 should obtain.

According to an embodiment of the present invention, at the time of adjustment of the recording medium, it is possible to obtain correct valuable information to which the game result of the table game is reflected. Thus, an embodiment of the present invention can be applied to various kinds of table game systems that can perform a table game by using a recording medium.

The present invention is not limited to the specifically disclosed embodiments, and variations and modifications may be made without departing from the scope of the present invention.

What is claimed is:

1. A table game system, comprising:

a dealer's game table for performing a table game;

a dealer terminal that can input game result information of the table game performed on the dealer's game table;

a plurality of valuable information reading devices that are provided at a position distant from the dealer's game table, and can read at least valuable information stored in a recording medium;

a plurality of player terminals that are provided to correspond to the valuable information reading devices, and can input betting information through reading the valuable information by the valuable information reading devices;

a value adjustment device that adjusts a value based on the valuable information; and an administrative server that is connected to each of the dealer terminal, the valuable information reading devices, the player terminals, and the value adjustment device via a communication line, wherein one of the valuable information devices and the player terminals is configured to transmit, to the administrative server, at least player terminal identification information for identifying the player terminals, when the valuable information is read by the valuable information reading devices, the administrative server includes:

a memory that can store the valuable information stored in the recording medium in association with the player terminal identification information transmitted from one of the valuable information reading devices and the player terminals;

a dividend information calculator configured to calculate dividend information based on the game result information that is input from the dealer terminal and the betting information that is input from the player terminals;

an updater that can individually update the valuable information stored in the memory in association with the player terminal identification information, based on the dividend information calculated by the dividend information calculator; and a transmitter that can transmit, to the value adjustment device, each set of updated valuable information that is stored in the memory and is updated by the updater, and the value adjustment device includes a player terminal identification information input device that can input the player terminal identification information and arranged to read the recording medium to which updated valuable information is written, wherein:

when the value adjustment device can read the recording medium to which the updated valuable information is written, the value adjustment device performs an exchange operation based on the updated valuable information that is read; and when the value adjustment device cannot read the recording medium to which the updated valuable information is written, the value adjustment device obtains the updated valuable information from the administrative server, when the player terminal identification information is input from the player terminal identification input device, the updated valuable information being stored in the memory in association with the player terminal identification information, and performs the exchange operation based on the obtained updated valuable information.

* * * * *